US012497718B2

(12) United States Patent
Salzmann

(10) Patent No.: US 12,497,718 B2
(45) Date of Patent: Dec. 16, 2025

(54) TEXTILE FABRIC MATERIAL WITH SHRINKAGE PROPERTIES AND ITS USE

(71) Applicant: Krall + Roth Services GmbH & Co. KG, Mönchengladbach (DE)

(72) Inventor: Oliver Salzmann, Mönchengladbach (DE)

(73) Assignee: Krall + Roth Services GmbH & Co. KG, Monchengladbach (DE)

( * ) Notice: Subject to any disclaimer, the term of this patent is extended or adjusted under 35 U.S.C. 154(b) by 216 days.

(21) Appl. No.: 17/469,772

(22) PCT Filed: Apr. 10, 2019

(86) PCT No.: PCT/EP2019/059046

§ 371 (c)(1),
(2) Date: Sep. 8, 2021

(87) PCT Pub. No.: WO2020/182319

PCT Pub. Date: Sep. 17, 2020

(65) Prior Publication Data

US 2024/0417896 A1 Dec. 19, 2024

(30) Foreign Application Priority Data

Mar. 8, 2019 (WO) ................. PCT/EP2019/000070

(51) Int. Cl.

| | |
|---|---|
| ***D03D 15/56*** | (2021.01) |
| ***A47C 7/24*** | (2006.01) |
| ***B60R 13/02*** | (2006.01) |
| ***D03D 15/283*** | (2021.01) |

(52) U.S. Cl.

CPC ............... *D03D 15/56* (2021.01); *A47C 7/24* (2013.01); *B60R 13/02* (2013.01); *D03D 15/283* (2021.01); *D10B 2331/04* (2013.01); *D10B 2401/04* (2013.01); *D10B 2401/061* (2013.01); *D10B 2505/08* (2013.01)

(58) Field of Classification Search

None
See application file for complete search history.

(56) References Cited

U.S. PATENT DOCUMENTS

2018/0368524 A1* 12/2018 Taniguchi .............. D03D 17/00

FOREIGN PATENT DOCUMENTS

| | | |
|---|---|---|
| DE | 202007014733 | 10/2008 |
| DE | 102013001912 | 8/2014 |

* cited by examiner

*Primary Examiner* — Shawn Mckinnon
(74) *Attorney, Agent, or Firm* — Brannon Sowers Cracraft; Edward E. Sowers

(57) ABSTRACT

The invention relates to a textile sheet structure (sheet material), in particular a textile covering material, preferably in the form of a woven fabric, preferably for furniture, such as seating and/or reclining furniture, preferably with heat-shrinkage properties and elastic properties, in particular a textile woven fabric with heat-shrinkage properties and elastic properties as a covering material for furniture, such as seating and/or reclining furniture, as well as its use and the heat-shrunk textile sheet structure obtainable in this way.

1 Claim, 5 Drawing Sheets

TEXTILE FABRIC MATERIAL WITH SHRINKAGE PROPERTIES AND ITS USE

CROSS-REFERENCES TO RELATED APPLICATIONS

This application is a National Stage filing of International Application PCT/EP 2019/059046 filed Apr. 10, 2019, entitled “TEXTILE WOVEN FABRIC MATERIAL WITH SHRINK PROPERTIES AND USE THEREOF”, claiming priority to PCT/EP 2019/000070, filed Mar. 8, 2019. The subject application claims priority to PCT/EP 2019/059046 and PCT/EP 2019/000070, and incorporates all by reference herein, in their entirety.

BACKGROUND OF THE INVENTION

The present invention relates to the technical field of functional textile materials and their use, in particular in the field of the furniture industry, for example for seating or reclining furniture, such as chairs or the like, and preferably for the formation of, in particular, substructure-free or self-supporting coverings or covers, preferably for backrests or seat parts or the like.

In particular, the present invention relates to the technical field of textile sheet materials with shrinkage properties, especially heat shrinkage properties.

In this context, the present invention relates to a textile sheet structure or sheet material, in particular a textile covering material, preferably in the form of a fabric, which preferably has heat-shrinkage properties and elastic properties and which can preferably be used for furniture, such as seating or reclining furniture, and in particular as a covering material.

In addition, the present invention also relates to a heat-shrunk textile sheet structure which is made from the textile sheet structure according to the invention or to a heat-shrunk textile sheet structure as such, which is in particular in the form of a heat-shrunk fabric and which is likewise elastic.

Furthermore, the present invention also relates to the use of the textile sheet structure according to the invention, which is preferably in the form of a woven fabric and which preferably has heat-shrinkage properties and elastic properties, for the manufacture or production of a heat-shrunk textile sheet structure, as well as a method for the manufacture of the heat-shrunk textile sheet structure.

The present invention also relates to the use of the textile sheet strcuture according to the invention, which is preferably in the form of a woven fabric and which has, in particular, heat-shrinkage properties and elastic properties, in the field of the furniture industry, automotive industry or the like, and for the manufacture of furniture elements, in particular seating and/or reclining furniture elements such as backrests or seat elements, and for the manufacture of decorative elements, cavity channels, automotive accessories and the like.

Furthermore, the present invention also relates to a method for manufacturing furniture elements, in particular seating and/or reclining furniture elements, such as backrests or seat elements, as well as for manufacturing decorative elements, cavity channels, automotive accessories and the like, using the textile sheet structure according to the invention, which is preferably in the form of a woven fabric and which preferably has heat-shrinkage properties and elastic properties.

Finally, the present invention also relates to furniture elements as such, in particular seating and/or reclining furniture elements such as backrests or seating elements, and furthermore also to decorative elements, cavity channels, automotive accessories and the like, which have the textile sheet structure according to the invention, which is formed in particular in the form of a woven fabric, preferably with heat-shrinkage properties and elastic properties, or which have the heat-shrunk textile sheet structure according to the invention, which is likewise formed in particular elastically.

In the furniture industry, especially in the manufacture of seating and reclining furniture, fabrics are often used which are fixed or stretched on corresponding carrier or frame devices (such as tenter frames or the like), for example to provide backrests or seating elements or seating surfaces for seating furniture or reclining surfaces for reclining furniture or the like.

In addition to the high optical or haptic requirements, such textile sheet structures or materials, as they are used in particular as coverings or cover fabrics of carrier or frame devices, in particular for providing backrests or seat elements or seat surfaces for seating furniture or the like, are also subject to high requirements in terms of their stability or mechanical properties:

In this context, it is particularly necessary that the textile fabrics used as coverings have a high mechanical stability, e.g. in order to be able to absorb the forces or loads that occur when they are used as backrests or seating surfaces or as lying surfaces under the corresponding load (“sitting down” or “lying down”). In this context, it is also an essential requirement that the textile sheet materials or structures used for this purpose also have corresponding (stretching) recovery properties, in particular with regard to the return of the material to the starting position or plane, as it were, after a load has been applied, whereby the material tension on the carrier or frame device is also to be maintained for this purpose in order to prevent permanent bulging or sagging of the sheet material or structure. In particular, a loss of (inherent) tension is to be avoided even after intensive or long-term use or stress, as is the case for seating or reclining furniture, for example.

For this reason, high demands are also placed on textile materials and structures used as coverings in that the materials should exhibit high elasticity and reversible stretchability. This improves both the stretching behavior during the manufacture of the corresponding products and the recovery of the material after mechanical stress.

Furthermore, it is also fundamentally necessary for textile surface materials used as coverings to provide a high level of sitting or reclining comfort, i.e. a correspondingly high level of ergonomics, in particular with regard to the manufacture of seating or reclining furniture, while at the same time also ensuring a high level of comfort. This can be provided in particular by a variable adaptation of corresponding coverings to the body shape or contour of a user, which occurs under sitting or lying stress (“sitting down”, “lying down”).

Overall, the processing properties of textile fabrics, such as those used in particular as coverings for support or frame devices, for example for seating or reclining furniture, are also of great importance. The behavior of the corresponding materials when attached or stretched on the corresponding support or frame devices is relevant in that it must be ensured that permanently crease- and dent-free coverings are provided. In particular, excessive wrinkle formation and insufficient tensioning force or the associated bulging of the fabric or cover are problematic, as they are associated with undesirable product properties and inferior product quality.

Against this background, attempts have been made in the prior art to counteract the formation of wrinkles or insufficient tensioning force by forming correspondingly precise blanks or seams with regard to the textile sheet materials used. One approach in the state of the art is to form corresponding coverings using several textile sections which are sewn together in order to enable a certain geometric adaptation to the shape of a carrier or frame device on this basis.

However, the aforementioned measures are generally accompanied by a deterioration in process economy and do not always result in the desired product properties. For example, the formation of the corresponding blanks and seams is already costly in terms of production technology. A further disadvantage in this context is that only limited shaping or design freedom can be achieved for the corresponding coverings, and the cut can only be adapted to a specific carrier or frame device. Furthermore, corresponding seam joints, such as those used in the multi-part design of covers or coverings to enable corresponding shape adaptation, sometimes represent weak points with regard to the load-bearing capacity and durability of the materials used. In addition, such seams can sometimes also be disadvantageous in terms of visual and tactile properties. With regard to the presence of multi-part blanks and seam joints, it is also often the case that undesirable creasing or bulging can sometimes occur, particularly in the area of more complex structures or shaping, such as in the area of corners, tapers, arches or the like of support or frame devices. Such materials also often do not have any specific measures to permanently prevent stress loss or bulging.

In addition, in the prior art for the production of the coverings in question, it is sometimes provided that the textile material to be processed is applied or fixed to a carrier or frame device under (pre-)tension, which, however, does not always lead to the desired results. In addition, in the state of the art, tensioning or fixing to a carrier or frame device, for example in the form of a welting frame or the like, is often only possible by elaborately sewing or gluing on the textile material, which is also associated with manufacturing-specific disadvantages.

In order to reduce the formation of folds with regard to the use as coverings of corresponding carrier or frame devices, it can generally be provided in the prior art in this context to use textile materials which have a certain stretchability. However, such materials are generally not suitable for use for such covers or coverings, which are attached to a carrier or frame device, in particular at the edges, especially since such textile materials sometimes do not have the (inherent) tensioning force required for a durable and functional covering.

WO 03/047395 A1 or EP 1 450 649 A1, which belongs to the same patent family, or US 2003/122411 A1, which likewise belongs to the same patent family, relates to a stretchable cover for an elastic cushion, the cover being intended to have a certain elastic restoring force.

All in all, there is a great demand in the state of the art for technical or functional textile fabrics or materials which are suitable for use as covering or covering material, in particular for seating or reclining furniture or the like, as well as for efficient processes for the provision of corresponding textile covering or covering materials, whereby efficient products are to be provided which can subsequently be supplied for final processing (in particular covering of corresponding carrier or frame devices, in particular of seating or reclining furniture or the like). At the same time, a high degree of flexibility and variability is required with regard to the specific design of the products provided, while at the same time a high degree of process economy and cost efficiency is required, which is not always provided to a sufficient degree in the state of the art.

BRIEF SUMMARY OF THE INVENTION

Against this background, it is thus an object of the present invention to provide a special textile sheet or sheet material which at least largely avoids or at least mitigates the disadvantages of the prior art described above, or which meets the high technical requirements mentioned above, in particular with respect to use as a covering or covering material. In particular, within the scope of the present invention, a textile sheet structure or sheet material is to be provided which is suitable in particular as a cover or covering material for seating or reclining furniture or the like and, in this respect, in particular for forming or providing backrests or seating elements or surfaces of seating furniture or of reclining surfaces of reclining furniture.

A further object of the present invention is also to provide a textile sheet structure or sheet material which, in particular when used as a covering or covering material, is intended to enable a permanently wrinkle-free covering or covering of corresponding support or frame devices or structures, in particular for seating or reclining furniture, such as chairs, or the like. In this context, the textile sheet structure or material provided according to the invention is to have a high elasticity or a high reversible stretchability with associated stretch recovery properties even after a high force-related stress has occurred, whereby these properties are also to be permanently present.

A further object of the present invention is also to provide a special textile sheet structure or sheet material which, while at the same time having a high load-bearing capacity or stability, exhibits a high degree of comfort or improved ergonomic properties, in particular in the context of use as a covering or covering material, preferably for seating furniture, reclining furniture or the like.

In addition, a further object of the present invention is to provide a textile sheet structure or sheet material which has a simplified structure using a reduced number of components forming the sheet structure or sheet material. In this context, the product or material properties should also be optimized with regard to its processing and use, in particular with regard to the provision of durable coverings which exhibit a high degree of freedom from wrinkles, inherent tension and ergonomic adaptability with simultaneously excellent (stretching) recovery properties.

In particular, the textile sheet structure or sheet material provided in accordance with the invention is intended to be suitable for the production of covers or coverings that do not require a substructure or are self-supporting, which are fastened or fixed, in particular at the edges, to corresponding carrier or frame devices or structures.

In this context, a further object of the present invention is also to provide an overall production-simplified and cost-optimized process for the manufacture of corresponding products, such as seating or reclining furniture, with provision of corresponding coverings based on the textile sheet structure or sheet material according to the invention.

Overall, it is also an object of the present invention to provide such a textile sheet structure or sheet material which is constructed or equipped in such a way that, on this basis, in particular permanently wrinkle-free coverings or coverings of support or frame devices or structures, in particular for seating or reclining furniture or the like, which can be subjected to force, are made possible, whereby a high internal stress of the covering or covering is to be present even after forceful loading, in order to prevent bulging or the like in this respect.

The applicant has now discovered in a completely surprising manner that the aforementioned problem of the present invention is solved by a special textile sheet structure (synonymously also referred to as sheet material), in particular textile covering material, which is preferably in the form of a woven fabric, preferably for furniture, such as seating or reclining furniture, wherein the textile sheet structure according to the invention is equipped in a target- and purpose-oriented manner, in particular with defined heat shrinkage properties and elastic properties.

In this context, the textile sheet structure according to the invention is in particular a textile fabric with heat shrinkage properties and with elastic properties, which can be used as a covering material or cover material for furniture, such as seating or reclining furniture.

In other words, the present invention thus relates to a special textile structure or sheet material, in particular with heat-shrinkage properties and with elastic properties, the textile sheet structure provided according to the invention being designed in particular as a textile fabric with heat-shrinkage properties and with elastic properties.

The textile sheet structure is characterized in that it has or consists of a yarn system forming the textile sheet structure, in particular a yarn composite, preferably a yarn system with a plurality of weft yarns (synonymously also referred to as wefts) and a plurality of warp yarns (synonymously also referred to as warps). In addition, the textile sheet structure according to the invention is also characterized in that the yarn system, in particular the yarn composite, preferably the yarn system with a plurality of weft yarns and a plurality of warp yarns, has or consists of at least one heat-shrinkable elastic plastic yarn which at least partially retains its elastic properties even after heat-shrinkage treatment has taken place.

In this context, the object described above is thus solved within the scope of the present invention—according to a first aspect of the invention—by a textile sheet structure or sheet material, in particular textile covering material, preferably in the form of a fabric, preferably for furniture, such as seating or reclining furniture, preferably with heat-shrinkage properties and elastic properties, according to the corresponding independent claim. Further, advantageous embodiments of the textile sheet structure according to the invention, preferably with heat-shrinkage properties and elastic properties.

A further subject of the present invention—according to a second aspect of the present invention—is furthermore the heat-shrunk textile sheet structure, which is obtainable or obtained by an at least sectional or area, preferably complete or full-surface heat treatment of the textile sheet structure, preferably with heat shrinkage properties and elastic properties, according to the invention or which has or consists of a yarn system forming the heat-shrunk textile sheet structure, the yarn system having or consisting of at least one heat-shrunk elastic plastic yarn which has at least partially retained its elastic properties even after the heat-shrinkage treatment has been carried out. Further, advantageous embodiments of the heat-shrunk textile fabric according to the invention are similarly provided.

Again, a further subject matter of the present invention—according to a third aspect of the present invention—is the use of the textile sheet structure according to the invention, which in particular has heat shrinkage properties and elastic properties, for producing or manufacturing the heat-shrunk textile sheet structure according to the invention described.

In addition, further subject matter of the present invention—according to a fourth aspect of the present invention—is the method for producing a heat-shrunk textile sheet structure. Further, advantageous embodiments of the method according to the present invention are the subject matter are similarly described.

Still further subject matter of the present invention—according to a fifth aspect of the present invention—is moreover the use of the textile sheet structure, in particular with heat-shrink properties and with elastic properties, or of the heat-shrunk textile sheet structure in the field of the furniture industry, automotive industry or the like in this respect.

A further subject matter of the present invention—according to a sixth aspect of the present invention—is further the use of the textile sheet structure, in particular with heat-shrink properties and with elastic properties, or of the heat-shrunk textile sheet structure for the manufacture of furniture elements or for the manufacture of decorative elements, cavity channels, automotive accessories or the like, respectively.

It is also a subject of the present invention—according to a seventh aspect of the present invention—to provide the method for manufacturing furniture elements or for manufacturing decorative elements, cavity channels, automotive accessories or the like.

Finally, according to an eighth aspect of the present invention, the subject matter of the present invention is furniture elements, decorative elements, cavity channels, automotive accessories or the like.

It goes without saying that in the following description of the present invention, such embodiments, embodiments, advantages, examples or the like which are set forth below—for the purpose of avoiding unnecessary repetition—only with respect to a single aspect of the invention, naturally also apply accordingly with respect to the other aspects of the invention, without the need for express mention.

Furthermore, it goes without saying that in the following statements of values, numbers and ranges, the relevant statements of values, numbers and ranges are not to be understood as limiting; it goes without saying for the person skilled in the art that, depending on the individual case or application, deviations from the stated ranges or statements can be made without leaving the scope of the present invention.

In addition, it applies that all values or parameters or the like mentioned in the following can in principle be determined with standardized or explicitly stated determination methods or otherwise with determination or measurement methods familiar to the specialist in this field. Unless otherwise stated, the underlying values or parameters are determined under standard conditions (i.e. in particular at a temperature of 20° C. and/or at a pressure of 1,013.25 hPa or 1.01325 bar).

In addition, it should be noted that in the case of all the relative or percentage, in particular weight-related, quantitative data listed below, these data are to be selected or combined by the person skilled in the art within the scope of the present invention in such a way that in total—if necessary including further components or ingredients, in particular as defined below—always 100% or 100% by weight results. However, this is self-evident for the person skilled in the art.

Having said this, the present invention will be described and explained in more detail below, also with reference to drawings or figure representations depicting embodiments or examples of embodiments according to the present invention. In connection with the explanation of these preferred embodiments or examples of embodiments of the present invention, which are, however, in no way limiting with respect to the present invention, further advantages, properties and features of the present invention will also be pointed out.

DETAILED DESCRIPTION OF THE INVENTION

Figure 1:
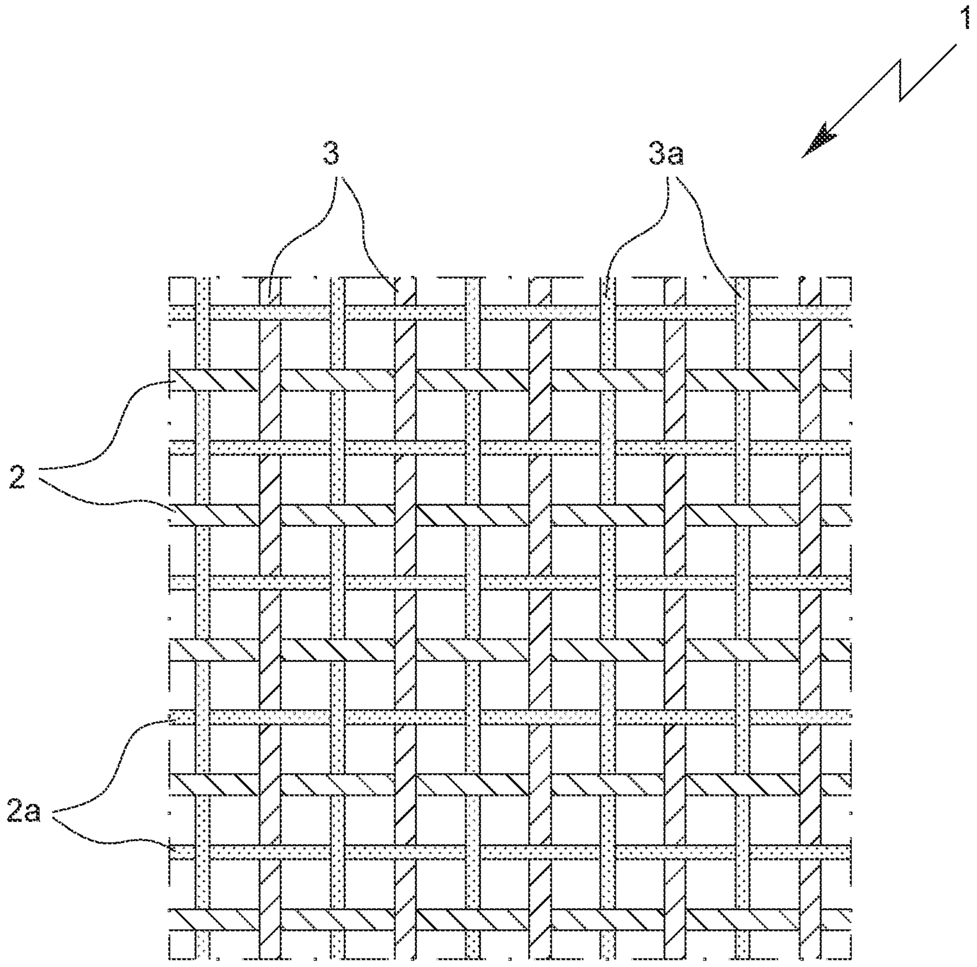
FIG. 1 provides a schematic representation of a textile sheet structure, which is formed in the form of a woven fabric, preferably with heat shrinkage properties and elastic properties, wherein the textile sheet structure has or consists of a yarn system based on a plurality of weft yarns and a plurality of warp yarns, wherein every second weft yarn and every second warp yarn are formed by a heat-shrinkable elastic plastic yarn, which even after heat shrinkage treatment retains its elastic properties at least in part. Each second weft yarn and each second warp yarn being formed by a heat-shrinkable elastic plastic yarn which at least partially retains its elastic properties even after heat-shrinkage treatment has been carried out, so that a textile sheet structure with elastic properties is present which is heat-shrinkable in the weft direction and in the warp direction.

A subject matter of the present invention—according to a first aspect of the present invention—is thus a textile sheet structure (sheet material), in particular textile covering material, preferably in the form of a woven fabric, preferably for furniture, such as seating and/or reclining furniture, preferably with heat shrinkage properties and elastic properties, in particular textile woven fabric with heat shrinkage properties and elastic properties as covering material for furniture, such as seating and/or reclining furniture, wherein the textile sheet structure comprises a yarn system forming the textile sheet structure, in particular a yarn composite, preferably a yarn system with a plurality of weft yarns (wefts) and a plurality of warp yarns (warps), the yarn system, in particular the yarn composite, preferably the yarn system with a plurality of weft yarns and a plurality of warp yarns, having or consisting of at least one heat-shrinkable elastic plastic yarn which at least partially retains its elastic properties even after heat-shrinkage treatment has taken place.

A fundamental idea of the present invention is thus to be seen in the fact that textile sheet material according to the invention, which is formed in particular in the form of a woven fabric, is covered in a purpose-directed manner with a special synthetic yarn (synonymously also as "heat-shrinkable elastic plastic thread", "heat-shrinkable elastic synthetic yarn", "heat-shrinkable elastic synthetic thread", "heat-shrinkable elastic plastic yarn" or "heat-shrinkable elastic yarn"), which is both heat-shrinkable and elastic.

Moreover, with regard to the special heat-shrinkable elastic plastic yarn used according to the invention, it behaves in such a way that it retains its elastic properties at least in part even after heat-shrinkage treatment has been carried out. Consequently, the textile sheet structure according to the invention exhibits, in particular, heat-shrinkable properties and elastic properties, or the textile sheet structure according to the invention is, in particular, heat-shrinkable and elastic, the elastic properties being at least partially retained even after heat-shrinkage has taken place. Consequently, the resulting heat-shrunk fabric also exhibits excellent elastic properties (since the elastic properties of the special plastic yarn are also reflected in the heat-shrunk fabric).

Thus, according to the invention, it is in particular the case that the textile sheet structure as such retains its elastic properties at least partially even after heat-shrinkage treatment of the textile sheet structure, due to the presence of the special heat-shrinkable elastic plastic yarn.

In particular, the present invention provides that both the heat shrinkage properties and the elastic properties of the textile sheet structure according to the invention are provided by one and the same component of the fabric, namely by the special plastic yarn.

Due to the use of a heat-shrinkable and elastic synthetic yarn, the present invention is accompanied by a simplified construction or a simplified structure of the textile sheet structure according to the invention, also to the extent that the number of components or constituents forming the sheet structure can be reduced. This also makes it possible to reduce the weight per unit area of the textile sheet structure according to the invention without negatively affecting the functionality or stability of the material.

A further advantage associated with the special use of a heat-shrinkable elastic plastic yarn, as described here, is that the corresponding heat-shrinkage properties and elastic properties of the textile sheet structure according to the invention can be adjusted or tailored in an improved manner, which in turn is beneficial for further processing with application to corresponding carrier or frame devices for the formation of wrinkle-free covers or coverings.

In addition, the textile sheet structure according to the invention can be manufactured relatively inexpensively due to the small number of components, both in terms of low costs for the materials to be used and in terms of the underlying manufacturing process for the textile sheet structure according to the invention. Thus, the manufacture of the sheet structure according to the invention is also simplified.

Due to its special properties, the textile sheet structure according to the invention is suitable, for example, in the furniture industry, in particular for the manufacture of seating or reclining furniture or the like (and in this respect in particular for the manufacture of backrests, seating or reclining surfaces), but also for use in the automotive industry or the like. In particular, the textile sheet structure according to the invention is suitable for covering support or frame devices or elements, such as support frames or the like. In this context, the textile sheet structure according to the invention can, for example, be fixed at the edge on or to such a carrier or frame device and subsequently be subjected to a shrinking process, wherein a durable and force-loadable as well as wrinkle-free covering or reference in this respect results. Due to its elastic properties, which continue to be present even after shrinkage, such a covering or cover also exhibits excellent stretch recovery properties as well as high (inherent) tension and, due to the excellent adaptation to body contours or the like, also high (seat) ergonomics.

According to the present invention, in particular self-supporting or substructure-free fabrics or covers can be provided, which are fastened in particular at the edges to corresponding carrier or frame devices, as mentioned above. In the context of the present invention, it is not necessary to use additional support structures or the like, such as foam pads or carrier plates, within the framework of the formation of coverings, not least because of the excellent force loading capacity and the excellent stretch recovery properties of the textile fabric, since the textile fabric can, as it were, be freely stretched directly and without further stabilizing measures onto a carrier or frame device. In principle, however, subsequent or subsequent upholstering cannot be ruled out.

A further advantage of the present invention is also to be seen in the fact that the textile sheet structure according to the invention, which is preferably formed as a woven fabric, can to a certain extent be applied directly to a carrier or frame device, for example a stenter frame, or fixed thereto, in particular at the edges, without the need in this respect for exact cutting or sewing with respect to the textile sheet structure. This is because the heat shrinking, which preferably takes place after the textile sheet structure has been applied or fixed to a carrier or frame device, causes the textile sheet structure according to the invention to be stretched to a certain extent due to the heat shrinking properties and thus to be smoothed or put under (inherent) tension, so that consequently an at least substantially wrinkle-free cover or covering results. As a result of the heat shrinkage process, a certain inherent tension is built up in the textile sheet structure according to the invention, which is applied to a carrier or frame structure or is fixed thereto, and this tension is further increased by the high elasticity present, so that a high load-bearing capacity in terms of force also results due to the pretension.

Due to the existing (inherent) tension, there is also a high load-bearing capacity without the textile sheet structure according to the invention being excessively or irreversibly stretched or bulging.

As a result of the high or defined elasticity of the textile sheet structure according to the invention, which is also present after heat shrinkage, it is equally ensured that the textile sheet structure according to the invention, which is applied in heat-shrunk form to a carrier or frame device, for example a seat of a chair or the like, can adapt ergonomically to the body contour in the state of use, which is accompanied by a high degree of comfort and excellent ergonomics. In addition, due to the defined elasticity, this also results in corresponding recovery properties after forceful loading, so that permanently wrinkle-free coverings or covers can also be provided from this point of view. In this context, the textile sheet structure according to the invention also exhibits its excellent stretch recovery properties in the heat-shrunk state as a result of high restoring forces, which counteracts bulging or the like accordingly.

A further advantage of the textile sheet structure according to the invention is also to be seen in the fact that, due to the heat shrinkage properties, there is a high degree of flexibility with respect to the carrier or frame device to be covered, wherein even strongly pronounced geometries or shaping and contours, such as tapers, curves, bends and the like can be covered (in particular on the edge areas) or covered in an effective manner while avoiding excessive wrinkle formation.

A further advantage of the textile sheet structure according to the invention is that there is a high resistance to wind shear with respect to the components or yarns forming the fabric, which also leads to a corresponding increase in stability and improved force loading, accompanied by reduced bulging.

According to the invention, the term “heat-shrinkable” or “heat shrinkage” or “heat shrinkage properties” is understood to mean in particular a size change or reduction caused or induced by heat or the influence of temperature, in particular in the area and thus in particular in the main extension plane or in at least one direction of extension of the textile sheet structure, this being caused in particular by a shortening or reduction in length of the heat-shrinkable elastic plastic yarn used according to the invention. In this context, with respect to the heat-shrinkable elastic plastic yarn, there may in principle be a thickening, i.e. an increase in diameter, as part of the heat shrinking process. Thus, in the context of the present invention, the heat shrinking is in particular a controlled reduction in size or length of the heat-shrinkable elastic plastic yarn used and thus or consequently of the textile sheet structure per se. In particular, the heat shrinkage present according to the invention, especially in the course of the subsequent processing of the textile sheet structure according to the invention, is an at least essentially irreversible shrinkage process. In this respect, however, it can be provided in principle that the textile sheet structure has defined residual (heat) shrinkage properties after heat shrinkage has taken place. As already mentioned, the heat-shrunk sheet structure is also provided with elastic properties.

In the context of the present invention, it is also particularly the case that the use of a heat-shrinkable elastic plastic yarn in the context of a heat treatment carried out can realize a heat shrinkage caused in the surface or main extension plane of the textile sheet structure according to the invention while at the same time maintaining the elasticity, which is accompanied in particular by a reduction in the area-related expansion of the material (length and/or depth or width), which leads to the optimized clamping behavior on a predetermined carrier or frame device. In the context of the present invention, the terms "length" and "width" refer to the respective directions of extension of the textile sheet structure in the main plane of extension.

Furthermore, the term "shrink temperature" or "heat shrink temperature", as used in the context of the present invention, is to be understood in particular in such a way that at the corresponding temperature there is an effective heat shrinkage, in particular of the heat-shrinkable elastic plastic yarn underlying the textile sheet structure according to the invention and thus of the textile sheet structure as a whole.

In the context of the present invention, the terms "yarn", on the one hand, and "thread", on the other hand, are used in particular synonymously, the aforementioned terms generally representing a collective term for all line-shaped textile structures. In this context, a yarn or thread may comprise one or more fibers or filaments. For example, the yarn or thread may be in the form of a monofilament or a multifilament, as indicated below. In particular, the heat-shrinkable elastic plastic yarn or thread used according to the invention is a monofilament yarn or thread.

As far as the term "elastic" or "elasticity" (synonymously also referred to as reversible stretchability) used according to the invention is concerned, this term refers in particular to the ability of the plastic yarn or the textile sheet structure in question to stretch under the effect of a (tensile) force (which equates to an increase in length for the plastic yarn and to an increase in length and/or width for the fabric) and, when the (tensile) force is released or ceases, to regain at least essentially completely or at least partially its original size or length or width, which equates to a reduction in size or length or width (to the initial size or length or width).

The term "fabric", as used in accordance with the invention, refers in particular to a textile fabric which is formed on the basis of a yarn system which has corresponding weft yarns (synonymously also referred to as wefts or weft yarns) and warp yarns (synonymously also referred to as warps or warp yarns). In particular, the weft and warp yarns cross each other at an angle of about 90 degrees, in particular in a pattern, as seen on the fabric surface, the connection of the yarns or yarns being made primarily by frictional engagement. In principle, the yarn system can have several warp or weft types, such as ground, pile or filling warps on the one hand and ground, binding and filling wefts on the other.

In the following, the present invention will be explained in more detail with reference to drawings or figure representations illustrating embodiments according to the invention. In connection with the explanation of these embodiments according to the invention, which however are in no way limiting with respect to the present invention, further advantages, properties, aspects and features of the present invention are also described.

In the drawing it shows:

FIG. 1 a schematic representation of a textile sheet structure, which is formed in the form of a woven fabric, preferably with heat shrinkage properties and elastic properties, wherein the textile sheet structure has or consists of a yarn system based on a plurality of weft yarns and a plurality of warp yarns, wherein every second weft yarn and every second warp yarn are formed by a heat-shrinkable elastic plastic yarn, which even after heat shrinkage treatment retains its elastic properties at least in part. Each second weft yarn and each second warp yarn being formed by a heat-shrinkable elastic plastic yarn which at least partially retains its elastic properties even after heat-shrinkage treatment has been carried out, so that a textile sheet structure with elastic properties is present which is heat-shrinkable in the weft direction and in the warp direction;

FIG. 2*a* schematic representation of a textile sheet structure according to the invention in the form of a woven fabric, preferably with heat-shrink properties and elastic properties according to a further embodiment according to the invention, according to which the textile sheet structure has or consists of a yarn system based on a plurality of weft yarns and a plurality of warp yarns, wherein every second weft yarn is formed by the heat-shrinkable elastic plastic yarn, which retains its elastic properties at least partially even after heat-shrinkage treatment has taken place, and wherein all the warp yarns are not formed by heat-shrinkable elastic plastic yarn, so that a textile sheet structure with elastic properties is present which is heat-shrinkable in the weft direction;

FIG. 3*a* schematic representation of a textile sheet structure according to the invention in the form of a woven fabric, preferably with heat-shrinkage properties and elastic properties, wherein the textile sheet structure has or consists of a yarn system based on a plurality of weft yarns and a plurality of warp yarns, wherein every second warp yarn is formed by a heat-shrinkable elastic plastic yarn which at least partially retains its elastic properties even after heat-shrinkage treatment has been carried out, and wherein all the weft yarns are not formed by the heat-shrinkable elastic plastic yarn in question, so that an elastic textile sheet structure is present which is designed to be heat-shrinkable in the warp direction;

FIG. 4*a* schematic representation of a textile sheet structure in the form of a woven fabric, preferably with heat-shrinkage properties and elastic properties, according to a further embodiment of the present invention, wherein the textile sheet structure has or consists of a yarn system based on a plurality of weft yarns and a plurality of warp yarns, wherein all the weft yarns and all the warp yarns are formed by a heat-shrinkable elastic plastic yarn which at least partially retains its elastic properties even after heat-shrinkage treatment;

FIG. 5*a* schematic representation of a heat-shrunk textile sheet structure according to the invention, according to which the heat-shrunk textile sheet structure is in the form of a heat-shrunk woven fabric and wherein the heat-shrunk textile sheet structure has a yarn system based on a plurality of weft yarns and a plurality of warp yarns, each second weft yarn and each second warp yarn being formed by a heat-shrunk elastic plastic yarn which has at least partially retained its elastic properties even after the heat-shrinkage treatment has been carried out.

FIGS. 1, 2, 3 and 4 thus show the textile sheet structure 1 according to the invention, in particular the textile covering material, preferably in the form of a fabric, preferably for furniture, such as seating and/or reclining furniture, preferably with heat-shrinkage properties and elastic properties, in particular textile fabric with heat-shrinkage properties and elastic properties as a covering material for furniture, such as seating and/or reclining furniture, wherein the textile sheet structure 1 comprises or consists of a yarn system 2, 2*a*, 3, 3*a* forming the textile sheet structure 1, in particular a yarn composite, preferably a yarn system with a plurality of weft yarns (wefts) 2, 2*a* and a plurality of warp yarns (warps) 3, 3*a*, wherein the yarn system 2, 2*a*, 3, 3*a*, in particular the yarn composite, preferably the yarn system with a plurality of weft yarns 2, 2*a* and a plurality of warp yarns 3, 3*a*, comprises or consists of at least one heat-shrinkable elastic plastic yarn which at least partially retains its elastic properties even after heat-shrinkage treatment.

With regard to the following explanations concerning the textile sheet structure 1 according to the invention, preferably with heat shrinkage properties and elastic properties, reference can equally also be made to FIG. 1, FIG. 2, FIG. 3 and FIG. 4.

According to the invention, a heat-shrinkable and elastic textile sheet structure or sheet material is thus provided, preferably in the form of a heat-shrinkable and elastic woven fabric based on a yarn system, the yarn system having a plurality of weft yarns and a plurality of warp yarns, it being provided in particular that the weft yarns, on the one hand, and the warp yarns, on the other hand, are each at least partially (i.e., based on the total number of weft yarns or warp yarns of the yarn system or woven fabric) replaced by a heat-shrinkable elastic plastic yarn which, even after the heat-shrinkage process has been completed, is made of a heat-shrinkable elastic plastic yarn which at least partially retains its elastic heat-shrinkage properties even after heat-shrinkage treatment has been carried out, or have such a heat-shrinkable and elastic plastic yarn.

On this basis, a special textile sheet structure is thus provided in accordance with the invention, in particular with defined heat-shrinkage properties and defined elastic—properties, the elastic properties being present as such even after heat-shrinkage treatment. As a result, the textile sheet structure according to the invention is excellently suited for covering corresponding carrier or frame devices, wherein on this basis permanently wrinkle-free covers or coverings can be provided which are under (inherent) tension and which have excellent elastic properties accompanied by high ergonomics and excellent stretch recovery properties.

According to the invention, it can be provided in particular that the heat-shrinkable elastic plastic yarn, which retains its elastic properties at least partially even after heat-shrinkage treatment has been carried out, is used and/or is present in particular in the form of a single yarn type (i.e. of the same yarn type), in particular in the form of a single yarn type with at least substantially identical and/or uniform heat-shrinkage properties and/or with at least substantially identical and/or uniform elasticity properties. In this respect, it can be provided in accordance with the invention that, in the case of different plastic yarns of the single yarn type, the plastic yarns which differ from one another differ from one another in their respective heat shrinkage properties and/or in their respective elasticity properties by at most 20%, in particular at most 10%, preferably at most 5%, preferably at most 2%, particularly preferably at most 1%, from one another, in particular relative to the respective larger value.

According to the invention, it can thus be provided in particular that no further heat-shrinkable elastic plastic yarns of a different yarn type, in particular in the form of a different yarn type with different heat shrinkage properties and/or different elasticity properties from the heat-shrinkable elastic plastic yarn used according to the invention, are used or present. As a result of the use or application of the heat-shrinkable elastic plastic yarn in the form of a single type of yarn, as defined above, uniform heat-shrinkage properties and elasticity properties are provided overall with respect to the textile sheet structure according to the invention. In addition, the material and cost requirements are reduced.

In particular, it may be provided in the context of the present invention that the yarn system 2, 2*a*, 3, 3*a*, in particular the yarn composite, preferably the yarn system with a plurality of weft yarns 2, 2*a* and a plurality of warp yarns 3, 3*a*, has the heat-shrinkable elastic plastic yarn, which retains its elastic properties at least in part even after heat-shrinkage treatment has taken place, in the form of a single type of yarn, in particular in the form of a single type of yarn having at least substantially identical and/or uniform heat-shrinkage properties and/or having at least substantially identical and/or uniform elasticity properties. In this respect, too, it may be provided in accordance with the invention that, in the case of different plastic yarns of the single yarn type, the plastic yarns differing from one another in their respective heat-shrinkage properties and/or in their respective elasticity properties differ from one another by at most 20%, in particular by at most 10%, preferably by at most 5%, preferably by at most 2%, particularly preferably by at most 1%, in particular relative to the respective larger value.

According to the invention, it can be provided for the sheet structure 1 according to the invention as a whole that it comprises or consists of the heat-shrinkable elastic plastic yarn, which retains its elastic properties at least partially even after heat-shrinkage treatment has been carried out, in the form of a single type of yarn, in particular as defined above. Consequently, it may be provided for the textile sheet structure according to the invention as a whole not to comprise a heat-shrinkable elastic plastic yarn different from the heat-shrinkable elastic plastic yarn used according to the invention or not to comprise a heat-shrinkable elastic plastic yarn having a yarn type different from the heat-shrinkable elastic plastic yarn used according to the invention, in particular as defined above. As previously indicated, it may also be provided according to the invention that in the case of different plastic yarns of the single yarn type (i.e., in particular, plastic yarns of the same yarn type), the plastic yarns which are different from one another differ from one another in their respective heat-shrinkage properties and/or in their respective elasticity properties, in particular in their respective elasticity properties, as defined above.

According to the invention, it can thus be provided in particular that the yarn system 2, 2*a*, 3, 3*a*, in particular the yarn composite, preferably the yarn system with a plurality of weft yarns 2, 2*a* and a plurality of warp yarns 3, 3*a*, in addition to and/or alongside the heat-shrinkable elastic plastic yarn, which retains its elastic properties at least partially even after heat-shrinkage treatment and which is present in the form of a single yarn type, in particular in the form of a single yarn type with at least substantially identical and/or uniform heat-shrinkage properties and/or with at least substantially identical and/or uniform elasticity properties, does not have any further and/or different heat-shrinkable elastic plastic yarn, in particular no further heat-shrinkable elastic plastic yarn of a different and/or different yarn type, preferably no further heat-shrinkable elastic plastic yarn of a different and/or different yarn type with different and/or different heat shrinkage properties and/or with different and/or different elasticity properties.

The same can equally apply to the textile sheet structure 1 according to the invention as such. According to the invention, it can thus be equally provided that the textile sheet structure 1, apart from or in addition to the heat-shrinkable elastic plastic yarn which at least partially retains its elastic properties even after the heat-shrinkage treatment has been carried out and which is present in the form of a single yarn type, in particular in the form of a single yarn type with at least substantially identical or uniform heat-shrinkage properties or with at least substantially identical or uniform elasticity properties, does not contain any further or any other heat-shrinkable elastic plastic yarn which is different therefrom, in particular no further heat-shrinkable elastic plastic yarn of a different yarn type, preferably no further heat-shrinkable elastic plastic yarn of a different yarn type with different heat-shrinkage properties or with different elasticity properties. In this respect, it may also be provided that, in the case of different plastic yarns of the single yarn type (i.e., in particular, plastic yarns of the same yarn type), the plastic yarns which are different from one another differ from one another in their respective heat shrinkage properties and/or in their respective elasticity properties, in particular in their respective elasticity properties, in accordance with the above.

In particular, it can be provided according to the invention that the heat-shrinkable elastic plastic yarn, which retains its elastic properties at least in part even after heat-shrinkage treatment, is used and/or present in the form of a single yarn type, in particular in the form of a single yarn type with at least essentially identical and/or uniform elasticity properties. In accordance with the invention, it may be provided that, in the case of different plastic yarns of the single yarn type, the plastic yarns differing from one another in their respective elasticity properties by at most 20%, in particular at most 10%, preferably at most 5%, preferably at most 2%, particularly preferably at most 1%, from one another, in particular based on the respective larger value.

In addition, it can be provided according to the invention that the yarn system 2, 2*a*, 3, 3*a*, in particular the yarn composite, preferably the yarn system with a plurality of weft yarns 2, 2*a* and a plurality of warp yarns 3, 3*a*, the heat-shrinkable elastic plastic yarn, which retains its elastic properties at least partially even after heat-shrinkage treatment has been carried out, in the form of a single type of yarn, in particular in the form of a single type of yarn having at least substantially identical and/or uniform elasticity properties, or consists thereof. According to the invention, moreover, in the case of different plastic yarns of the single yarn type, the plastic yarns which differ from one another may differ from one another in their respective elastic properties by at most 20%, in particular by at most 10%, preferably by at most 5%, preferably by at most 2%, particularly preferably by at most 1%, in particular relative to the respective greater value.

Furthermore, it can be provided according to the invention that the yarn system 2, 2*a*, 3, 3*a*, in particular the yarn composite, preferably the yarn system with a plurality of weft yarns 2, 2*a* and a plurality of warp yarns 3, 3*a*, apart from and/or in addition to the heat-shrinkable elastic plastic yarn, which retains its elastic properties at least in part even after heat-shrinkage treatment has been carried out and which is in the form of a single yarn type, in particular in the form of a single type of yarn having at least substantially identical and/or uniform elasticity properties, no further and/or no heat-shrinkable elastic plastic yarn different therefrom, in particular no further heat-shrinkable elastic plastic yarn of a different and/or different type of yarn, preferably no further heat-shrinkable elastic plastic yarn of a different and/or different type of yarn having different and/or different elasticity properties.

According to the invention, in other words, it can also be provided in particular that in the event that the yarn system 2, 2*a*, 3, 3*a*, in particular the yarn composite, preferably the yarn system with a plurality of weft yarns 2, 2*a* and a plurality of warp yarns 3, 3*a*, has or consists of several and/or different heat-shrinkable elastic plastic yarns which retain their elastic properties at least partially even after heat-shrinkage treatment has been carried out, all of these heat-shrinkable elastic plastic yarns, which retain their elastic properties at least partially even after heat-shrinkage treatment has been carried out, are of the same yarn type and/or are in the form of a single yarn type, in particular in the form of a single yarn type with at least substantially identical and/or uniform heat-shrinkage properties and/or with at least substantially identical and/or uniform elasticity properties. According to the invention, it can be provided in principle that, in the case of different plastic yarns of the same and/or of the single yarn type, the plastic yarns which differ from one another differ from one another in their respective heat shrinkage properties and/or their respective elasticity properties by at most 20%, in particular at most 10%, preferably at most 5%, preferably at most 2%, particularly preferably at most 1%, from one another, in particular relative to the respective larger value. Accordingly, it can behave according to the invention in such a way that the yarn system 2, 2*a*, 3, 3*a* or the textile sheet structure 1 according to the invention as such, in particular according to the above specifications, does not have any further or different yarn type of heat-shrinkable elastic plastic yarn in addition to the yarn type of the heat-shrinkable elastic plastic yarn used.

Within the scope of the present invention, it can also be provided that the yarn system 2, 2*a*, 3, 3*a*, in particular the yarn composite, preferably the yarn system with a plurality of weft yarns 2, 2*a* and a plurality of warp yarns 3, 3*a*, does not have any heat-shrinkable inelastic plastic yarn or is free from heat-shrinkable inelastic plastic yarns. Accordingly, in accordance with the invention, it can be provided in particular that the heat-shrinkable properties are provided at least substantially exclusively by the heat-shrinkable elastic plastic yarn used in accordance with the invention, which retains its elastic properties at least partially even after heat-shrinkage treatment has been carried out. In this context, too, a central advantage of the present invention is to be seen in the fact that heat-shrinkage properties on the one hand and elasticity properties on the other are provided, as it were, by one and the same plastic yarn or type of yarn, which is also accompanied in particular by the provision of defined heat-shrinkage or elasticity properties with simultaneously reduced material costs. In this context, the term "inelastic" refers in particular to those yarns which have no elasticity or at most a low elasticity, in particular wherein the maximum elasticity is at most 10%, preferably at most 5%, preferably at most 2%, of the elasticity of the heat-shrinkable and elastic plastic yarn used according to the invention. In this context, it can also be provided according to the invention, in particular, that the textile sheet structure 1 according to the invention as such does not have any heat-shrinkable inelastic plastic yarn or is free from heat-shrinkable and inelastic plastic yarns.

Similarly, it can be provided according to the invention that the yarn system 2, 2*a*, 3, 3*a*, in particular the yarn composite, preferably the yarn system with a plurality of weft yarns 2, 2*a* and a plurality of warp yarns 3, 3*a*, does not have any non-heat-shrinkable elastic plastic yarn or is free from non-heat-shrinkable elastic plastic yarns. For example, it may be provided according to the invention that the yarn system 2, 2*a*, 3, 3*a* does not comprise any non-heat-shrinkable rubber yarns or the like. This also ensures that the heat shrinkage and elasticity properties are provided by one and the same plastic yarn or yarn type. In this context, the term “non heat-shrinkable” refers in particular to those yarns which have no or at most a low heat shrinkability, in particular wherein the maximum heat shrinkability is at most 10%, preferably at most 5%, preferably at most 2%, of the heat shrinkability of the heat-shrinkable and elastic plastic yarn used according to the invention. In a corresponding manner, it may be provided for the textile sheet structure 1 according to the invention as such to have no non-heat-shrinkable elastic plastic yarn or to be free of non-heat-shrinkable elastic plastic yarns.

According to the invention, it is provided in particular, as shown in FIG. 1, FIG. 2, FIG. 3 and FIG. 4, respectively, that the weft yarns 2, 2*a* and/or the warp yarns 3, 3*a*, in particular the weft yarns 2, 2*a* and the warp yarns 3, 3*a*, are at least partially formed by the heat-shrinkable elastic plastic yarn which at least partially retains its elastic properties even after heat-shrink treatment has been carried out (namely the weft yarns 2*a* or the warp yarns 3*a*), in particular wherein the weft yarns 2*a* formed by the heat-shrinkable elastic plastic yarn, which at least partially retains its elastic properties even after heat-shrinkage treatment has been carried out, are present or formed as heat-shrinkable weft yarns and/or in particular wherein the warp yarns 3*a* formed by the heat-shrinkable elastic plastic yarn, which at least partially retains its elastic properties even after heat-shrinkage treatment has been carried out, are formed as heat-shrinkable warp yarns.

In other words, according to the invention, it can behave in particular in such a way that at least part of the total or of the total number of weft yarns and/or warp yarns are formed by the heat-shrinkable elastic plastic yarn which at least partially retains its elastic properties even after heat-shrinkage treatment has been carried out, in particular the weft yarns formed by the heat-shrinkable elastic plastic yarn which at least partially retains its elastic properties even after heat-shrinkage treatment being carried out, which at least partially retains its elastic properties even after the heat-shrinkage treatment has been carried out, in particular wherein the weft yarns 2*a* formed by the heat-shrinkable elastic plastic yarn, which at least partially retains its elastic properties even after the heat-shrinkage treatment has been carried out, are formed as heat-shrinkable weft yarns and, in a corresponding manner, the warp yarns 3*a* formed by the heat-shrinkable elastic plastic yarn in question are formed as heat-shrinkable warp yarns.

According to the invention, the heat-shrinkable elastic plastic yarn, which at least partially retains its elastic properties even after heat-shrinkage treatment, is present in the form of weft yarns 2*a*, in particular heat-shrinkable weft yarns, and/or in the form of warp yarns 3*a*, in particular heat-shrinkable warp yarns, in the yarn system 2, 2*a*, 3, 3*a* or in the textile sheet structure 1, respectively in that the heat-shrinkable elastic plastic yarn, which at least partially retains its elastic properties even after heat-shrinkage treatment has been carried out, is a constituent of weft yarns 2*a*, in particular heat-shrink weft yarns, and/or of warp yarns 3*a*, in particular heat-shrink warp yarns, and/or the weft yarns 2*a*, in particular heat-shrink weft yarns, and/or the warp yarns 3*a*, in particular heat-shrink warp yarns, are formed from the heat-shrinkable elastic plastic yarn which at least partially retains its elastic properties even after heat-shrink treatment.

According to the invention, it can be provided in particular that the weft yarns 2*a* and/or the warp yarns 3*a*, in particular the weft yarns 2*a* and the warp yarns 3*a*, are formed entirely or in their total number by the heat-shrinkable elastic plastic yarn, which retains its elastic properties at least in part even after the heat-shrink treatment has been carried out.

In accordance with the invention, it is thus provided in this context in particular that the heat-shrinkable elastic plastic yarn, which retains its elastic properties at least in part even after heat-shrinkage treatment has been carried out, is present in the form of the weft yarns 2*a*, in particular heat-shrinkable weft yarns, and/or in the form of the warp yarns 3*a*, in particular heat-shrinkable warp yarns, as equally shown in FIG. 1, FIG. 2, FIG. 3 and FIG. 4.

Figure 2:
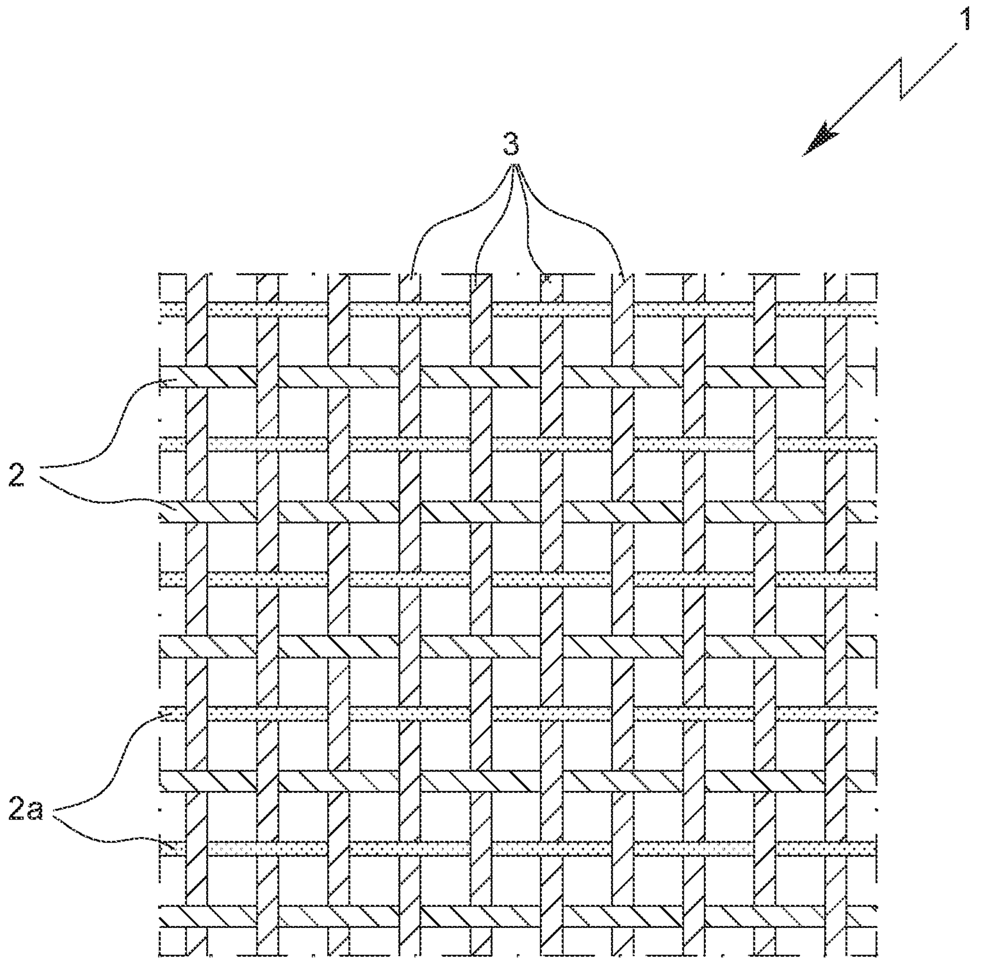
FIG. 2 provides a schematic representation of a textile sheet structure according to the invention in the form of a woven fabric, preferably with heat-shrink properties and elastic properties according to a further embodiment according to the invention, according to which the textile sheet structure has or consists of a yarn system based on a plurality of weft yarns and a plurality of warp yarns, wherein every second weft yarn is formed by the heat-shrinkable elastic plastic yarn, which retains its elastic properties at least partially even after heat-shrinkage treatment has taken place, and wherein all the warp yarns are not formed by heat-shrinkable elastic plastic yarn, so that a textile sheet structure with elastic properties is present which is heat-shrinkable in the weft direction.
Figure 4:
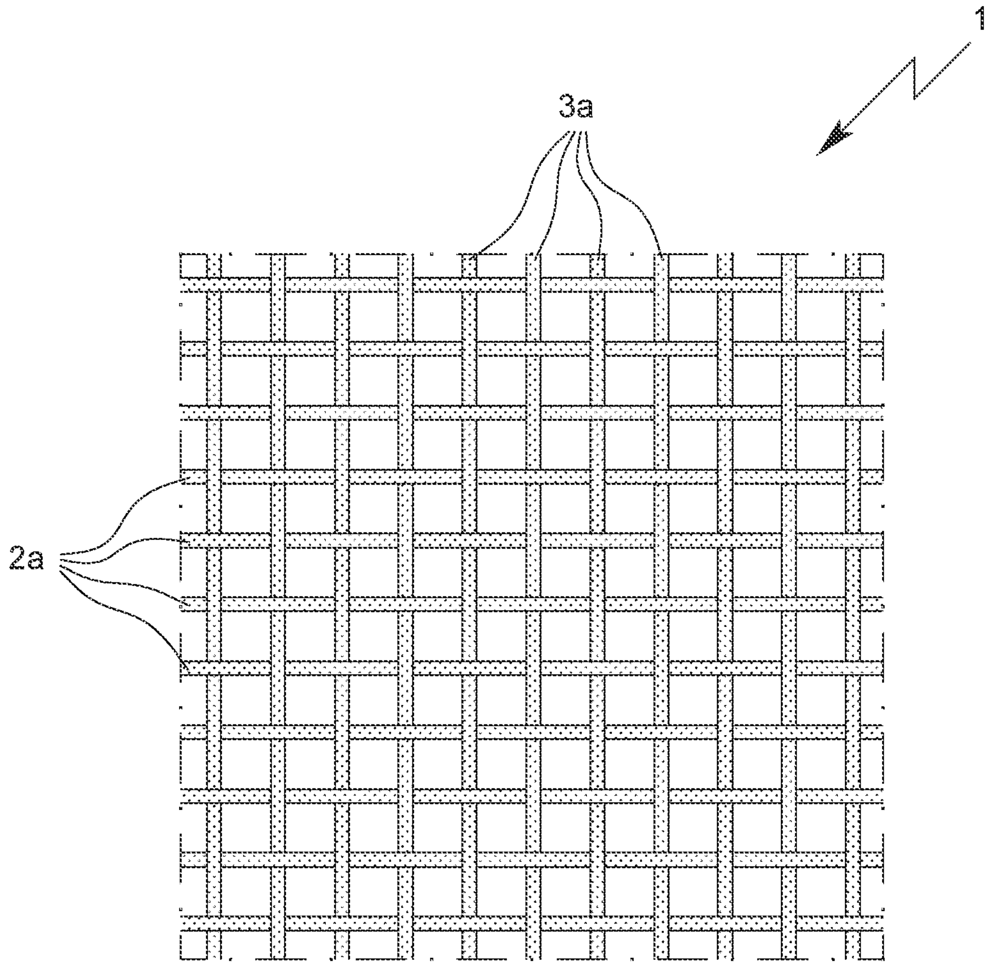
FIG. 4 provides a schematic representation of a textile sheet structure in the form of a woven fabric, preferably with heat-shrinkage properties and elastic properties, according to a further embodiment of the present invention, wherein the textile sheet structure has or consists of a yarn system based on a plurality of weft yarns and a plurality of warp yarns, wherein all the weft yarns and all the warp yarns are formed by a heat-shrinkable elastic plastic yarn which at least partially retains its elastic properties even after heat-shrinkage treatment.

In particular, it can be provided according to the invention that, as exemplarily shown in FIG. 1, FIG. 2 and FIG. 4, the weft yarns 2*a* formed by the heat-shrinkable elastic plastic yarn, which at least partially retains its elastic properties even after heat-shrink treatment, are formed in the form of heat-shrink weft yarns (heat-shrink wefts) or are present as such.

Figure 3:
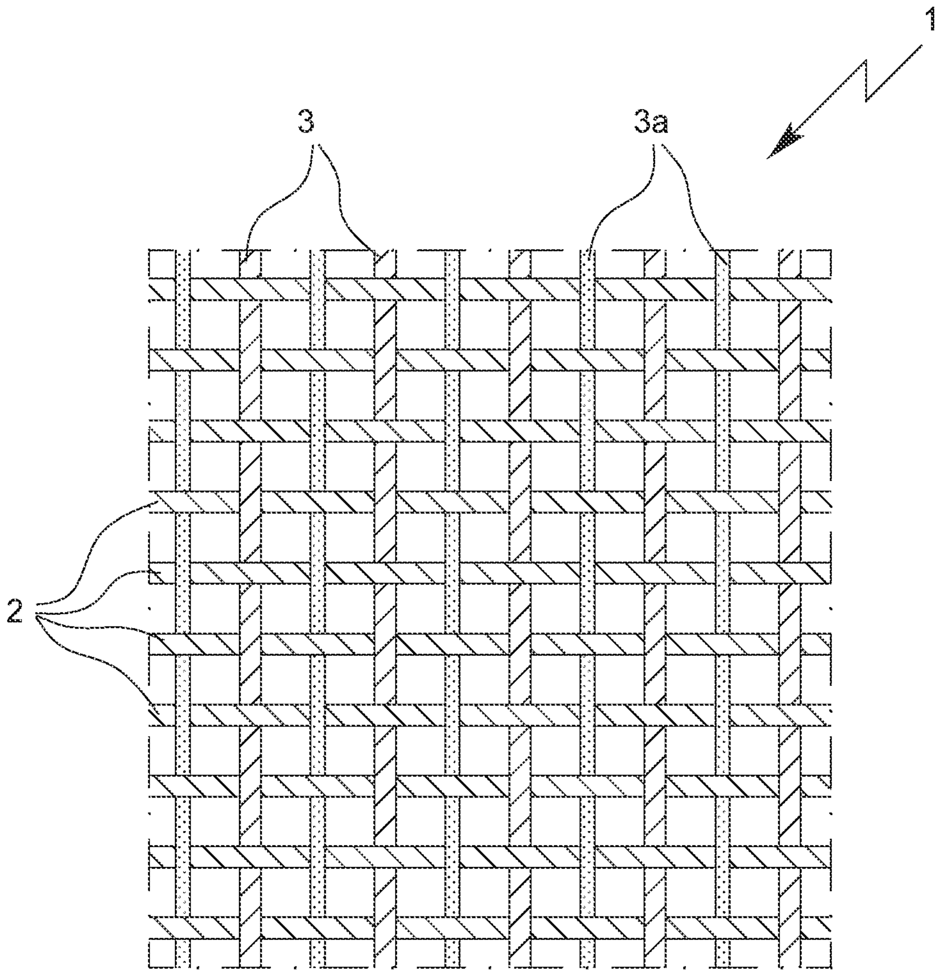
FIG. 3 provides a schematic representation of a textile sheet structure according to the invention in the form of a woven fabric, preferably with heat-shrinkage properties and elastic properties, wherein the textile sheet structure has or consists of a yarn system based on a plurality of weft yarns and a plurality of warp yarns, wherein every second warp yarn is formed by a heat-shrinkable elastic plastic yarn which at least partially retains its elastic properties even after heat-shrinkage treatment has been carried out, and wherein all the weft yarns are not formed by the heat-shrinkable elastic plastic yarn in question, so that an elastic textile sheet structure is present which is designed to be heat-shrinkable in the warp direction.

Similarly, it can be provided according to the invention that the warp yarns 3*a* formed by the heat-shrinkable elastic plastic yarn, which retains its elastic properties at least in part even after heat-shrink treatment, are in the form of heat-shrink warp yarns (heat-shrink warps) or are present as such, as equally illustrated in FIG. 1, FIG. 3 and FIG. 4.

Also against the background of the above explanations, it can be provided according to the invention that the textile sheet structure 1 is designed to be heat-shrinkable and/or elastic in at least one direction of extension, in particular with respect to the main plane of extension, preferably in both directions of extension of the textile sheet structure 1 in question. In this context, it can be provided, for example, that only weft yarns or only warp yarns are formed on the basis of or in the form of the heat-shrinkable elastic plastic yarn (shrinkability in one extension direction in each case) or that both weft yarns and warp yarns are formed on the basis of or in the form of the heat-shrinkable elastic plastic yarn (shrinkability in both extension directions). In this way, the heat shrinkage properties or elasticity properties can be individually formed or tailored with respect to the respective extension direction.

Furthermore, it can be provided within the scope of the present invention that every twelfth, in particular every tenth, preferably every eighth, preferably every second to every sixth, particularly preferably every second to every fourth weft yarn 2, 2*a* is formed by the heat-shrinkable elastic plastic yarn which at least partially retains its elastic properties even after heat-shrinkage treatment has been carried out (which is then present in each case as a heat-shrinkable weft yarn 2*a* or heat-shrinkable weft yarn 2*a*, respectively) and/or as a weft yarn 2*a* formed by the heat-shrinkable elastic plastic yarn which at least partially retains its elastic properties even after heat-shrinkage treatment has been carried out. In this regard, reference can be made, for example, to FIG. 1 and FIG. 2, each of which illustrates that, according to the invention, every second weft yarn 2, 2*a* can be formed as a heat-shrinkable weft yarn 2*a* or heat-shrinkable weft yarn 2*a*.

Furthermore, according to the invention, it can also be provided that every second to every twelfth, in particular every to every tenth, preferably every to every eighth, preferably every second to every sixth, particularly preferably every second to every fourth warp yarn 3, 3*a* is formed by the heat-shrinkable elastic plastic yarn which at least partially retains its elastic properties even after heat-shrinkage treatment has been carried out (which is then present in each case as a heat-shrinkable warp yarn 3*a* or heat-shrinkable weft yarn 3*a*, respectively) or as a warp yarn 3*a* or heat-shrinkable elastic plastic yarn which at least partially retains its elastic properties even after heat-shrinkage treatment has been carried out. In this respect, FIG. 1 and FIG. 3 illustrate an embodiment according to the invention, according to which every second warp yarn 3, 3*a* is formed as a heat-shrinkable warp yarn 3*a* and heat-shrinkable warp yarn 3*a*, respectively.

In this context, it is also understood that the weft direction and warp direction of the textile sheet structure 1 can have mutually identical or mutually different sequences or a mutually identical or mutually different number of heat-shrink weft yarns 2*a* or heat-shrink warp yarns 3*a*. Thereby, the respective sequence or number can also vary or be different within an extension direction, so to speak, section by section. In this way, the heat shrinkage properties in the textile sheet structure 1 can be formed section by section or individually.

In general, it may be provided in the context of the present invention that the heat-shrinkable elastic plastic yarn, which retains its elastic properties at least in part even after heat-shrinkage treatment has been carried out, is incorporated or present in the form of at least one base yarn (heat-shrink base yarn), in particular in the form of at least one base weft yarn (heat-shrink base weft yarn) and/or at least one base warp yarn (heat-shrink base warp yarn).

In addition, according to the invention, it can also be provided in principle that the heat-shrinkable elastic plastic yarn, which at least partially retains its elastic properties even after heat-shrink treatment, is incorporated or present in the form of at least one filler yarn (heat-shrink filler yarn), in particular in the form of at least one filler weft yarn (heat-shrink filler weft yarn) and/or at least one filler warp yarn (heat-shrink filler warp yarn).

Finally, according to the invention, it can also be provided in principle that the heat-shrinkable elastic plastic yarn, which at least partially retains its elastic properties even after heat-shrink treatment, is incorporated and/or present in the form of at least one pile yarn (heat-shrink pile yarn), in particular in the form of at least one pile weft yarn (heat-shrink pile yarn) and/or at least one pile warp yarn (heat-shrink pile warp yarn).

With regard to the above embodiments, corresponding combinations can also be considered.

In general, the amount or content of heat-shrinkable elastic plastic yarn in the textile sheet structure 1 according to the invention may vary within wide ranges. In particular, it may be provided according to the invention that the sheet structure 1 contains the heat-shrinkable elastic plastic yarn, which retains its elastic properties at least partially even after heat-shrinkage treatment has been carried out, in an amount in the range of 1 wt. % to 100 wt. % by weight, in particular in the range from 3% by weight to 95% by weight, preferably in the range from 5% by weight to 80% by weight, preferably in the range from 8% by weight to 50% by weight, particularly preferably in the range from 10% by weight to 40% by weight, very particularly preferably in the range from 15% by weight to 30% by weight, based on the sheet-like structure 1. Here, too, the heat shrinkage properties and elasticity properties can be further specified or individually adjusted.

In addition, it may also be provided that the yarn system 2, 2*a*, 3, 3*a* contains the heat-shrinkable elastic plastic yarn, which retains its elastic properties at least partially even after heat-shrinkage treatment, in an amount in the range from 1% to 100% by weight, in particular in the range from 3% to 95% by weight, preferably in the range from 5% to 80% by weight, preferably in the range from 8% to 50% by weight, particularly preferably in the range from 10% to 40% by weight.% to 95% by weight, preferably in the range from 5% to 80% by weight, preferably in the range from 8% to 50% by weight, particularly preferably in the range from 10% to 40% by weight, most preferably in the range from 15% to 30% by weight, based on the yarn system 2, 2*a*, 3, 3*a*.

In particular, the heat-shrinkable elastic plastic yarn, which is formed in particular as weft yarn 2*a*, in particular heat-shrinkable weft yarn, and/or as warp yarn 3*a*, in particular heat-shrinkable warp yarn, can be in particular heat-shrinkable elastic plastic yarn, which—retains its elastic properties at least partially even after the heat-shrinkage treatment has been carried out, by a factor of 0.15 to 5, in particular by a factor of 0.25 to 3, preferably by a factor of 0.5 to 2, preferably by a factor of 0.6 to 1.5, compared with the respective adjacent yarn, 6 times to 1.5 times, particularly preferably 0.75 times to 1 times, the mean yarn diameter of the heat-shrinkable elastic plastic yarn, which retains its elastic properties at least in part even after heat-shrinkage treatment, relative to the unshrunk state.

In general, it can be provided according to the invention that the heat-shrinkable elastic plastic yarn, which retains its elastic properties at least in part even after heat-shrinkage treatment has been carried out, is formed as a monofilament or as a multifilament, preferably as a monofilament.

According to the invention, it is also possible in principle for the heat-shrinkable elastic plastic yarn, which at least partially retains its elastic properties even after heat-shrinkage treatment, to be in the form of a staple fiber yarn (coreyarn). Similarly, it is also possible in principle for the heat-shrinkable elastic plastic yarn to be used in combination with other yarns or yarns, for example in adhesive twisting or the like, in which case non-heat-shrinkable and/or inelastic yarns or yarns can also be used in principle.

According to the invention, particularly good results with regard to heat shrinkage behavior and elasticity are obtained in particular in the case where the heat-shrinkable elastic plastic yarn, which at least partially retains its elastic properties even after heat shrinkage treatment, is based on or consists of at least one heat-shrinkable elastomeric or thermoplastic polymer and/or on at least one thermoplastic elastomer (TPE).

In particular, the heat-shrinkable elastic plastic yarn, which at least partially retains its elastic properties even after heat-shrinkage treatment, can be based on or consist of a heat-shrinkable elastomeric and/or thermoplastic polyester.

In general, the heat-shrinkable elastic plastic yarn, which retains at least some of its elastic properties even after heat-shrink treatment, can have a residual elongation before heat-shrink treatment of less than 30%, preferably of less than 20%, preferably of less than 10%, most preferably of less than 5%.

In addition, the heat-shrinkable elastic plastic yarn, which retains its elastic properties at least in part even after the heat-shrink treatment has been carried out, can have a residual elongation after the heat-shrink treatment of less than 35%, preferably of less than 25%, preferably of less than 15%, very particularly preferably of less than 10%.

It may be provided that the residual elongation of the plastic yarn after the heat shrinkage treatment carried out exceeds the residual elongation of the plastic yarn before the heat shrinkage treatment carried out by less than 50%, in particular by less than 40%, preferably by less than 30%, preferably by less than 20%, particularly preferably by less than 10%, most preferably by less than 5%.

In general, the elasticity or the residual elongation can be determined according to DIN 53 835-2, in particular by carrying out the tensile stress several times or multi-cyclically, especially within the framework of five cycles. However, the residual elongation can also be determined according to DIN 53 835-3 by carrying out the tensile stress once or in a single cycle. Tensile stressing according to DIN 53 835-2 or DIN 53 835-3 is carried out as follows:

In particular, the plastic yarn is clamped in a testing device for tensile tests (e.g. Zwick, type BZ 1.0/TH1S). A free clamping length is specified as the initial length, for example 100 mm. The clamped plastic yarn is then subjected to tensile stress, for example at a test speed of 50 mm/min, until a predetermined total length of the plastic yarn is reached (for example starting from 100 mm to a total length of 125 mm). This allows the total change in length (difference between the total length and the initial length or the free clamping length) and the total elongation (quotient of total change in length and initial length) to be determined. Subsequently, the tensile force acting on the plastic yarn is resolved and the residual elongation (difference between the length of the plastic yarn after tensile stress and the initial length of the plastic yarn before tensile stress) is determined. This finally allows the residual elongation (quotient of the residual length change after tensile stress and the initial length or free clamping length before tensile stress) to be determined.

According to the invention, for example, the heat-shrinkable elastic plastic yarns manufactured and sold by Colorific Monofil GmbH, which are available in particular in the form of monofilaments, can be used, for example of the types Q373, Q372 and Q371.

According to the invention, the heat-shrinkable elastic plastic yarn, which at least partially retains its elastic properties even after heat-shrinkage treatment has been carried out, can have a diameter in the range from 0.05 mm to 1.5 mm, in particular in the range from 0.075 mm to 1.2 mm, preferably in the range from 0.1 mm to 1 mm, preferably in the range from 0.1 mm to 0.8 mm, particularly preferably in the range from 0.15 mm to 0.7 mm.

Similarly, the heat-shrinkable elastic plastic yarn, which at least partially retains its elastic properties even after heat-shrinkage treatment has been carried out, may have a linear density in the range from 50 dtex to 8,000 dtex, in particular in the range from 100 dtex to 6,000 dtex, preferably in the range from 200 dtex to 5,000 dtex, preferably in the range from 250 dtex to 4,500 dtex, particularly preferably in the range from 300 dtex to 4,000 dtex.

In particular, the heat-shrinkable elastic plastic yarn, which retains at least some of its elastic properties even after heat-shrink treatment, may have a titre in the range from 25 den to 7,500 den, in particular in the range from 50 den to 5,000 den, preferably in the range from 100 den to 4,500 den, preferably in the range from 150 den to 4,000 den, particularly preferably in the range from 200 den to 3,500 den.

In general, the diameter can be determined by methods known to the skilled person, for example on the basis of optical or light microscopic methods. In addition, the titer can be determined in particular on the basis of DIN EN ISO 2060:1995-04.

The heat-shrinkable elastic plastic yarn, which retains its elastic properties at least in part even after heat-shrinkage treatment, can also have a tensile strength in the range from 1 N to 500 N, in particular in the range from 2 N to 400 N, preferably in the range from 3 N to 300 N, preferably in the range from 4 N to 250 N, particularly preferably in the range from 5 N to 200 N, most preferably in the range from 10 N to 150 N. The tensile strength can be determined in particular on the basis of DIN EN ISO 2062:2010-04.

In addition, the heat-shrinkable elastic plastic yarn, which retains at least some of its elastic properties even after heat-shrink treatment, can have an elongation at break in the range from 10% to 85%, in particular in the range from 15% to 80%, preferably in the range from 20% to 75%, preferably in the range from 25% to 70%, particularly preferably in the range from 30% to 65%.

In addition, the heat-shrinkable elastic plastic yarn, which at least partially retains its elastic properties even after heat-shrink treatment, can have an elongation at break of more than 10%, in particular more than 20%, preferably more than 30%, preferably more than 40%, particularly preferably more than 50%, most preferably more than 55%. The elongation at break may be present in particular at a temperature of 10° C. to 100° C., in particular 10° C. to 50° C., preferably at about 20° C. The elongation at break can be determined in particular on the basis of ISO 3341:2000-05 or DIN EN ISO 2062:2010-04.

In addition, the heat-shrinkable elastic plastic yarn, which at least partially retains its elastic properties even after heat-shrink treatment, can have a tenacity in the range from 15 cN/tex to 130 cN/tex, in particular in the range from 25 cN/tex to 110 cN/tex, preferably in the range from 35 cN/tex to 100 cN/tex, preferably in the range from 35 cN/tex to 70 cN/tex. In particular, the fineness strength may be present at a temperature of 10° C. to 100° C., in particular 10° C. to 50° C., more preferably at about 20° C. The fineness strength can be determined in particular on the basis of DIN 53 816 or DIN 53 834 (Parts 1 to 3) or DIN EN ISO 2062:2010-04.

Furthermore, the heat-shrinkable elastic plastic yarn, which at least partially retains its elastic properties even after heat-shrinkage treatment has been carried out, can have a shrinkage force in the range from 15 cN to 1,100 cN, in particular in the range from 25 cN to 1,000 cN, preferably in the range from 40 cN to 900 cN, preferably in the range from 50 cN to 500 cN.

In addition, the heat-shrinkable elastic plastic yarn, which retains at least some of its elastic properties even after heat-shrinkage treatment, can have a shrinkage force in the range from 0.5 cN/tex to 15 cN/tex, in particular in the range from 1 cN/tex to 10 cN/tex, preferably in the range from 1.5 cN/tex to 5 cN/tex, preferably in the range from 2 cN/tex to 4 cN/tex.

The above-mentioned shrinkage force can be present in particular at a shrinkage temperature or temperature of 140° C. to 240° C., in particular 160° C. to 200° C., preferably about 180° C. The shrinkage force can be determined in particular on the basis of DIN 53 866 (Part 12), in particular at a treatment time of 20 s with treatment in air or with a pretensioning force of 1 cN.

The heat-shrinkable elastic plastic yarn, which retains its elastic properties at least in part even after heat-shrink treatment, can also have a heat shrinkage (heat shrinkability) in the range from 2% to 60%, in particular in the range from 3% to 40%, preferably in the range from 4% to 35%, preferably in the range from 5% to 25%, based on the length in the unshrunk state. The aforementioned heat shrinkage is present in particular at a shrinkage temperature or temperature of 60° C. to 140° C., in particular 80° C. to 120° C., preferably about 100° C., and/or in particular at a heat shrinkage duration in the range of 1 min to 20 min, in particular 5 min to 15 min, preferably about 10 min, and in particular under load-free conditions and/or air as surrounding medium. For the determination of the heat shrinkage, reference can be made in particular to DIN 53 866.

Furthermore, the heat-shrinkable elastic plastic yarn, which at least partially retains its elastic properties even after heat-shrinkage treatment, can have a residual heat shrinkage (residual heat shrinkability) in the range from 1% to 35%, in particular in the range from 2% to 30%, preferably in the range from 3% to 30%, based on the length in the unshrunk and/or preshrunk state. The aforementioned residual heat shrinkage is present in particular at a temperature of 60° C. to 160° C., in particular 80° C. to 140° C., preferably about 120° C., and/or in particular at a (residual) heat shrinkage time in the range from 1 min to 20 min, in particular 5 min to 15 min, preferably about 10 min, and/or at a load of 10 g to 20 g, in particular about 15 g and/or using air as the surrounding medium.

With regard to the sheet structure 1 according to the invention, in particular with heat shrinkage properties and elastic properties, it may further have, according to the invention, a density of weft yarns 2, 2*a* in the range from 5 to 150 weft yarns per cm, in particular in the range from 10 to 100 weft yarns per cm, preferably in the range from 15 to 75 weft yarns per cm.

In addition, the sheet structure 1 according to the invention may have a density of warp yarns 3, 3*a* in the range of 5 to 150 warp yarns per cm, in particular in the range of 10 to 100 warp yarns per cm, preferably in the range of 15 to 75 warp yarns per cm.

In general, the textile sheet structure 1 according to the invention may have a basis weight in the range from 20 g/m2 to 1,500 g/m2, in particular in the range from 40 g/m2 to 1,000 g/m2, preferably in the range from 60 g/m2 to 500 g/m2.

According to the invention, it can also be provided that the sheet structure 1 or the yarn system 2, 2*a*, 3, 3*a*, in particular the yarn composite, preferably the yarn system with a plurality of weft yarns (wefts) 2, 2*a* and a plurality of warp yarns (warps) 3, 3*a*, comprises at least one natural yarn (natural yarn) and/or at least one synthetic yarn (man-made yarn), in particular wherein the natural yarn and/or the synthetic yarn is selected from the group consisting of wool fibers or yarns yarns, cotton fibers resp. yarns (CO), polyesters—(PES); polyolefins, in particular polyethylene (PE) and/or polypropylene (PP); polyvinyl chlorides (CLF); polyvinylidene chlorides (CLF); acetates (CA); triacetates (CTA); polyacrylonitrile (PAN); polyamides (PA); polyvinyl alcohols (PVAL); polyurethanes; polyvinyl esters; (meth) acrylates; and combinations and/or mixtures thereof.

For further details in particular on the term textile yarns or fibers—further synonymously also referred to as textile fiber materials—reference may be made, for example, to Römpp Chemielexikon, Georg Thieme Verlag Stuttgart/New York, Volume 6, 1999, pages 4477 to 4479, keyword: “textile fibers”, the entire disclosure content of which, including the literature references cited therein, is hereby incorporated by reference. In particular, in the context of the present invention, the term textile yarns or fibers is understood as a collective term for all yarns or fibers that can be processed into textiles. The textile yarns or fibers have in common a large length compared to their cross-section, as well as sufficient strength and flexibility, whereby a subdivision into different groups can be made according to origin and material composition. In particular, the yarns or fibers generally provided within the scope of the present invention may be in the form of (textile) yarns or (textile) yarns.

In particular, according to the invention, the weft yarns 2 and/or warp yarns 3 not formed by the heat-shrinkable elastic plastic yarn are formed by the further yarn as defined above. For this purpose, different or mutually different yarns can also be used in one and the same sheet structure 1.

Consequently, according to the invention, it behaves in particular in such a way that the weft yarns 2 and/or warp yarns 3 not formed by the heat-shrinkable elastic plastic yarn, which retains its elastic properties at least in part even after heat-shrinkage treatment has taken place, are formed by a natural yarn (natural yarn) and/or a synthetic yarn (chemical yarn), as defined above, and in particular with the proviso that it is not a heat-shrinkable inelastic (plastic) yarn and/or not a non-heat-shrinkable elastic (plastic) yarn (cf. above explanations).

The aforementioned natural yarns or synthetic yarns may in particular be non-heatshrinkable and/or inelastic yarns.

Furthermore, the textile sheet structure 1 according to the invention may comprise the natural yarn and/or the synthetic yarn in an amount in the range of 0.5% by weight to 99% by weight, in particular in the range of 1% by weight to 95% by weight, preferably in the range of 5% by weight to 90% by weight, preferably in the range of 10% by weight to 75% by weight, more preferably in the range of 15% by weight to 50% by weight, based on the sheet structure 1.

In general, the textile sheet structure 1 according to the invention should have a sliding resistance, in particular seam sliding resistance, in particular in each case related to the warp direction or weft direction, of at least 40 N, in particular at least 50 N, preferably at least 60 N, preferably at least 80 N, particularly preferably at least 100 N. For the determination, reference can be made to DIN 53 868.

In addition, the textile sheet structure 1 according to the invention should have a tensile strength, in particular in each case relative to the warp direction or weft direction, of at least 60 N, in particular at least 80 N, preferably at least 100 N, preferably at least 120 N. In this regard, reference can also be made to EN ISO 13934-1.

According to the invention, the textile sheet structure 1 can be elastic in the weft direction and/or in the warp direction, preferably in the weft direction and in the warp direction. In this context, the elasticity or the total elongation of the fabric in the weft direction and/or in the warp direction, independently of one another, in particular at a tensile force of 25 N, can be in the range from 2% to 25%, in particular in the range from 5% to 20%, preferably in the range from 10% to 20%, in particular relative to the length of the fabric in the weft direction and/or in the warp direction and in the unstretched state of the fabric. In addition, the sheet structure 1, in particular in the weft direction and/or in the warp direction, in particular at a tensile force of 25 N, can have a permanent elongation of at most 2%, in particular at most 1%, preferably at most 0.5%, preferably at most 0.1%, in particular based on the length of the sheet-like structure in the weft direction and/or in the warp direction and in the unstretched state of the sheet-like structure. In this regard, reference can be made in particular to DIN 53 360. The above values can be determined, for example, with a universal testing machine with the designation Zwick 1455, in particular with a material clamping length of 200 mm, a gauge length of 100 mm and a specimen width of 50 mm under standard climate conditions (DIN EN ISO 139).

In this context, the textile sheet structure 1 according to the invention as such also exhibits excellent heat shrinkability: Thus, in particular in the weft direction and/or in the warp direction, in the weft direction and in the warp direction, independently of one another, the flat sheet structure 1 can exhibit a heat shrinkage (heat shrinkability) in the range from 2% to 60%, in particular in the range from 3% to 40%, preferably in the range from 4% to 35%, preferably in the range from 5% to 25%, based on the length of the flat sheet structure in the weft direction and/or in the warp direction in the unshrunk state. The heat shrinkage values in this respect are present in particular at a temperature of 60° C. to 160° C., in particular 80° C. to 140° C., preferably about 120° C., and/or in particular at a heat shrinkage duration in the range from 1 min to 20 min, in particular 5 min to 15 min, preferably about 10 min, and in particular using air as the surrounding medium and/or with load-free shrinkage. In this respect, reference can also be made to the above statements on the heat shrinkage behavior of the heat-shrinkable elastic plastic yarn.

The textile sheet structure 1 according to the invention is thus characterized overall by self-supporting properties, high heat shrinkability and high elasticity, which leads to excellent recovery behavior after force loading, so that the material according to the invention is also therefore particularly suitable for use as a covering or covering of support or frame structures, in particular of furniture elements.

As far as the textile sheet structure 1 according to the invention is further concerned, it can, for example, be heat-shrunk to form corresponding coverings or coverings, in particular at temperatures in the range from 60° C. to 140° C., in particular in the range from 80° C. to 120° C., preferably at about 100° C. In this way, the heat-shrunk textile sheet 1' described below can be obtained according to the invention.

Accordingly, a further object of the present invention—according to a second aspect of the invention—is a heat-shrunk textile sheet structure (sheet material) 1', in particular heat-shrunk textile covering material, preferably in the form of a heat-shrunk fabric, preferably for furniture, such as seating and/or reclining furniture, preferably with elastic properties, in particular heat-shrunk textile fabric with elastic properties as covering material for furniture, such as seating and/or reclining furniture, wherein the heat-shrunk textile sheet structure 1' comprises or consists of a yarn system 2', **2*a*', 3', 3*a*' forming the heat-shrunk textile sheet structure 1', in particular a yarn composite, preferably a yarn system with a plurality of weft yarns (wefts) 2', 2*a*' and a plurality of warp yarns (warps) 3', 3*a*', wherein the heat-shrunk textile sheet structure 1' is obtainable or is obtained by a heat treatment of a textile sheet structure (sheet material) 1** defined in the preceding claims at least in sections and/or areas, preferably completely and/or over the entire surface.

In this respect, the present invention thus also relates to a heat-shrunk textile sheet structure (sheet material) 1', in particular heat-shrunk textile covering material, preferably in the form of a heat-shrunk fabric, preferably for furniture, such as seating and/or reclining furniture, preferably with elastic properties, in particular heat-shrunk textile fabric with elastic properties as a covering material for furniture such as seating and/or reclining furniture, in particular the previously described heat-shrunk textile sheet structure 1, wherein the heat-shrunk textile structure 1' has or consists of a yarn system 2', **2*a*', 3', 3*a*' forming the heat-shrunk textile sheet structure 1', in particular a yarn composite, preferably a yarn system with a plurality of weft yarns (wefts) 2', 2*a*' and a plurality of warp yarns (warps) 3', 3*a*'** wherein the yarn system 2', **2*a*', 3', 3*a*', in particular the yarn composite, preferably the yarn system with a plurality of weft yarns 2, 2*a* and a plurality of warp yarns 3, 3*a***, comprises or consists of at least one heat-shrunk elastic plastic yarn which has at least partially retained its elastic properties even after the heat-shrinkage treatment has been carried out.

Figure 5:
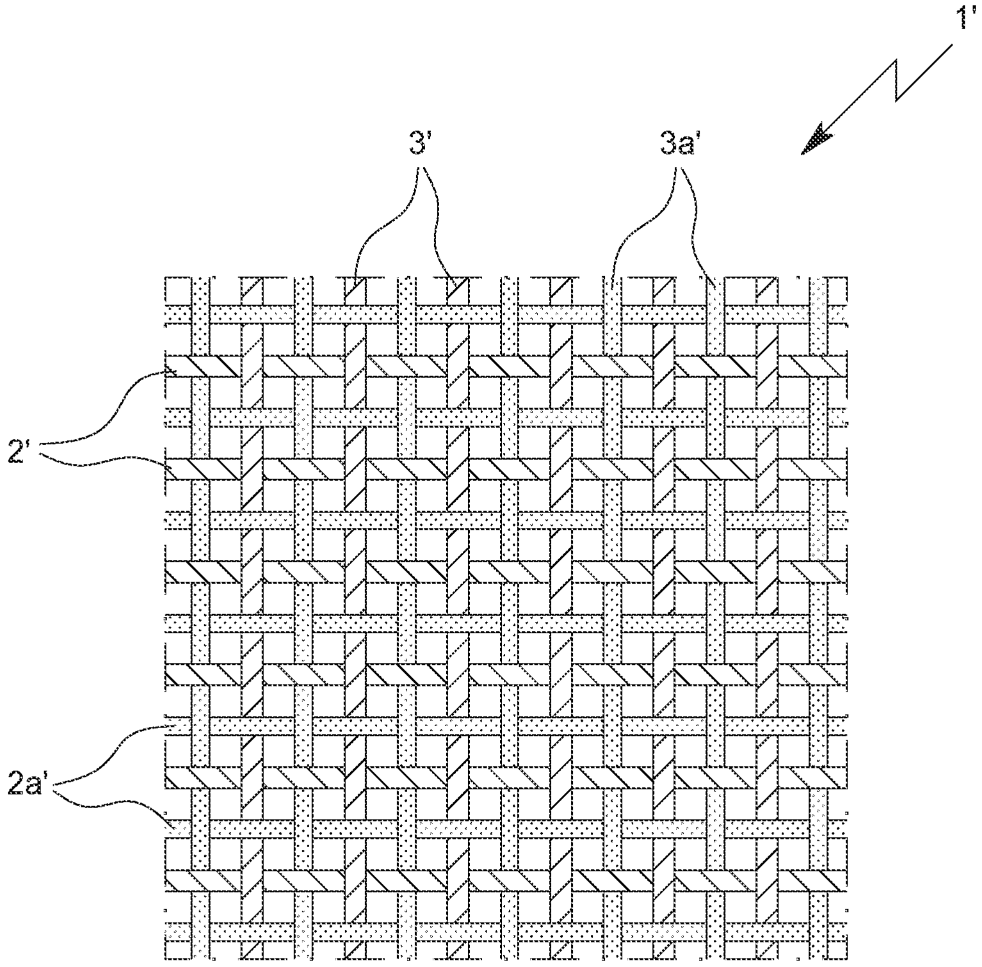
FIG. 5 provides a schematic representation of a heat-shrunk textile sheet structure according to the invention, according to which the heat-shrunk textile sheet structure is in the form of a heat-shrunk woven fabric and wherein the heat-shrunk textile sheet structure has a yarn system based on a plurality of weft yarns and a plurality of warp yarns, each second weft yarn and each second warp yarn being formed by a heat-shrunk elastic plastic yarn which has at least partially retained its elastic properties even after the heat-shrinkage treatment has been carried out.

With regard to the heat-shrunk sheet structure 1' according to the invention, reference can also be made to FIG. 5.

In particular, it can be provided according to the invention that the heat-shrunk elastic plastic yarn, which has at least partially retained its elastic properties even after the heat-shrinkage treatment has been carried out, is used and/or is present in the form of a single type of yarn, in particular in the form of a single type of yarn, in particular with at least substantially identical and/or uniform heat-shrinkage properties and/or uniform elasticity properties. According to the invention, it may be provided that, in the case of different plastic yarns of the single yarn type, the plastic yarns differing from one another in their respective heat shrinkage properties and/or in their respective elasticity properties differ from one another by at most 20%, in particular by at most 10%, preferably by at most 5%, preferably by at most 2%, particularly preferably by at most 1%, in particular relative to the respective larger value.

In particular, the yarn system 2', **2*a*', 3', 3*a*', in particular the yarn composite, preferably the yarn system with a plurality of weft yarns 2', 2*a*' and a plurality of warp yarns 3', 3*a*'**, can have the heat-shrunk elastic plastic yarn which has at least partially retained its elastic properties even after the heat-shrinkage treatment has been carried out, in the form of a single type of yarn, in particular in the form of a single type of yarn having at least substantially identical and/or uniform heat-shrinkage properties and/or having at least substantially identical and/or uniform elasticity properties. According to the invention, it may be provided that, in the case of different plastic yarns of the single yarn type, the plastic yarns differing from one another in their respective heat shrinkage properties and/or in their respective elasticity properties differ from one another by at most 20%, in particular by at most 10%, preferably by at most 5%, preferably by at most 2%, particularly preferably by at most 1%, in particular relative to the respective larger value.

In addition, the yarn system 2', **2*a*', 3', 3*a*', in particular the yarn composite, preferably the yarn system with a plurality of weft yarns 2', 2*a*' and a plurality of warp yarns 2', 2*a*'**, can be used in addition to and/or alongside the heat-shrunk elastic plastic yarn, which has at least partially retained its elastic properties even after heat-shrinkage treatment has taken place and which is in the form of a single yarn type, in particular in the form of a single yarn type having at least substantially identical and/or uniform heat-shrinkage properties and/or having at least substantially identical and/or uniform elasticity properties, no further and/or no heat-shrunk elastic plastic yarn different therefrom, in particular no further heat-shrunk elastic plastic yarn of a different and/or different yarn type, preferably no further heat-shrunk elastic plastic yarn of a different and/or different yarn type with different and/or different heat shrinkage properties and/or with different and/or different elasticity properties.

In particular, it can be provided according to the invention that the heat-shrunk elastic plastic yarn, which has at least partially retained its elastic properties even after the heat-shrinkage treatment has been carried out, is used and/or is present in the form of a single yarn type, in particular in the form of a single yarn type with at least essentially identical and/or uniform elasticity properties. According to the invention, it can also be provided in this case that, in the case of different plastic yarns of the single yarn type, the plastic yarns which differ from one another differ from one another in their respective elasticity properties by at most 20%, in particular at most 10%, preferably at most 5%, preferably at most 2%, particularly preferably at most 1%, from one another, in particular relative to the respective larger value.

In addition, it can be provided according to the invention that the yarn system 2', **2*a*', 3', 3*a*', in particular the yarn composite, preferably the yarn system with a plurality of weft yarns 2', 2*a*' and a plurality of warp yarns 3', 3*a*'**, the heat-shrunk elastic plastic yarn, which has at least partially retained its elastic properties even after the heat-shrinkage treatment has been carried out, in the form of a single type of yarn, in particular in the form of a single type of yarn having at least substantially identical and/or uniform elastic properties. According to the invention, it may also be provided in this context that, in the case of different plastic yarns of the single yarn type, the plastic yarns differing from one another in their respective elasticity properties by at most 20%, in particular at most 10%, preferably at most 5%, preferably at most 2%, particularly preferably at most 1%, from one another, in particular relative to the greater value.

Furthermore, it can be provided according to the invention that the yarn system 2', **2*a*', 3', 3*a*', in particular the yarn composite, preferably the yarn system with a plurality of weft yarns 2', 2*a*' and a plurality of warp yarns 2', 2*a*'**, apart from and/or in addition to the heat-shrunk elastic plastic yarn, which has at least partially retained its elastic properties even after heat-shrinkage treatment and which is in the form of a single yarn type, in particular in the form of a single type of yarn having at least substantially identical and/or uniform elasticity properties, no further and/or no heat-shrunk elastic plastic yarn different therefrom, in particular no further heat-shrunk elastic plastic yarn of another and/or different type of yarn, preferably no further heat-shrunk elastic plastic yarn of another and/or different type of yarn having other and/or different elasticity properties.

In addition, according to the invention, it can be provided in particular that in the event that the yarn system 2', **2*a*', 3', 3*a*', in particular the yarn composite, preferably the yarn system with a plurality of weft yarns 2', 2*a*' and a plurality of warp yarns 3', 3*a*'**, has or consists of several and/or different heat-shrunk elastic plastic yarns, which have at least partially retained their elastic properties even after heat-shrinkage treatment has taken place, all of these heat-shrunk elastic plastic yarns, which have at least partially retained their elastic properties even after the heat-shrinkage treatment has been carried out, are of the same yarn type and/or are in the form of a single yarn type, in particular in the form of a single yarn type with at least essentially identical and/or uniform heat-shrinkage properties and/or with at least essentially identical and/or uniform elasticity properties. In this context, it may be provided that, in the case of different plastic yarns of the single yarn type, the plastic yarns differing from one another in their respective heat shrinkage properties and/or in their respective elasticity properties differ from one another by at most 20%, in particular by at most 10%, preferably by at most 5%, preferably by at most 2%, particularly preferably by at most 1%, in particular relative to the respective larger value.

According to the invention, it can be provided that the yarn system 2', **2*a*', 3', 3*a*', in particular the yarn composite, preferably the yarn system with a plurality of weft yarns 2', 2*a*' and a plurality of warp yarns 3', 3*a*'**, does not have any heat-shrunk inelastic plastic yarn or is free from heat-shrunk inelastic plastic yarns.

According to the invention, it can be provided that the yarn system 2', **2*a*', 3', 3*a*', in particular the yarn composite, preferably the yarn system with a plurality of weft yarns 2', 2*a*' and a plurality of warp yarns 3', 3*a*'**, does not comprise a non-heat-shrinkable elastic plastic yarn or is free of non-heat-shrinkable elastic plastic yarns.

According to the invention, it can also be provided that the weft yarns 2', **2*a*' and/or the warp yarns 3', 3*a*', in particular the weft yarns 2', 2*a*' and the warp yarns 3', 3*a*'**, are at least partially formed by the heat-shrunk elastic plastic yarn, which has at least partially retained its elastic properties even after the heat-shrinkage treatment has been carried out.

In general, it can be provided according to the invention that the weft yarns **2*a*' and/or the warp yarns 3*a*', in particular the weft yarns 2*a*' and the warp yarns 3*a*'**, are completely—formed by the heat-shrunk elastic plastic yarn which has at least partially retained its elastic properties even after the heat-shrink treatment has been carried out.

In addition, the heat-shrunk elastic plastic yarn, which has at least partially retained its elastic properties even after the heat-shrinkage treatment has been carried out, can be in the form of the weft yarns **2*a*' (heat-shrunk weft yarns) and/or in the form of the warp yarns 3*a*'** (heat-shrunk warp yarns).

In particular, according to the invention, the weft yarns **2*a*'** formed by the heat-shrunk elastic plastic yarn, which has at least partially retained its elastic properties even after heat-shrinkage treatment, are in the form of heat-shrunk weft yarns or are present as such.

Moreover, according to the invention, it behaves in particular in such a way that the warp yarns **3*a*'** formed by the heat-shrunk elastic plastic yarn, which has at least partially retained its elastic properties even after the heat-shrinkage treatment has been carried out, are in the form of heat-shrunk warp yarns or are present as such.

According to the invention, it can be provided in particular that every twelfth, in particular every tenth, preferably every eighth, preferably every second to every sixth, particularly preferably every second to every fourth weft yarn 2', **2*a*' is formed by the heat-shrunk elastic plastic yarn, which has at least partially retained its elastic properties even after the heat-shrinkage treatment has been carried out, and/or is present as a heat-shrunk weft yarn 2*a*'** formed from the heat-shrunk elastic plastic yarn which has at least partially retained its elastic properties even after the heat-shrinkage treatment has been carried out.

Similarly, it can be provided according to the invention that every twelfth, in particular every tenth, preferably every eighth, preferably every second to every sixth, particularly preferably every second to every fourth warp yarn 3', **3*a*' is formed by the heat-shrunk elastic plastic yarn, which has at least partially retained its elastic properties even after the heat-shrinkage treatment has been carried out, and/or is present as a heat-shrunk warp yarn 3*a*'** formed from the heat-shrunk elastic plastic yarn which has at least partially retained its elastic properties even after the heat-shrinkage treatment has been carried out.

In particular, according to the invention, the heat-shrunk elastic plastic yarn, which has at least partially retained its elastic properties even after heat-shrinkage treatment, is incorporated or present in the form of at least one ground yarn (heat-shrunk ground yarn), in particular in the form of at least one ground weft yarn (heat-shrunk ground weft yarn) and/or at least one ground warp yarn (heat-shrunk ground warp yarn).

In addition, according to the invention, the heat-shrunk elastic plastic yarn, which has at least partially retained its elastic properties even after heat-shrinkage treatment, is incorporated in the form of at least one filling yarn (heat-shrunk filling yarn), in particular in the form of at least one filling weft yarn (heat-shrunk filling weft yarn) and/or at least one filling warp yarn (heat-shrunk filling warp yarn).

Similarly, according to the invention, the heat-shrunk elastic plastic yarn, which has at least partially retained its elastic properties even after heat-shrinkage treatment, is incorporated or present in the form of at least one pile yarn (heat-shrunk pile yarn), in particular in the form of at least one pile weft yarn (heat-shrunk pile weft yarn) and/or at least one pile warp yarn (heat-shrunk pile warp yarn).

Combinations in this regard are also possible.

In general, the sheet structure 1' according to the invention can contain the heat-shrunk elastic plastic yarn, which has at least partially retained its elastic properties even after the heat-shrinkage treatment has been carried out, in an amount in the range from 1% to 100% by weight, in particular in the range from 3 wt. % to 95% by weight, preferably in the range from 5% by weight to 80% by weight, preferably in the range from 8% by weight to 50% by weight, particularly preferably in the range from 10% by weight to 40% by weight, most preferably in the range from 15% by weight to 30% by weight, based on the sheet structure 1'.

In particular, it can be provided according to the invention that the heat-shrunk elastic plastic yarn formed in particular as weft yarn 2$a$', in particular heat-shrink weft yarn, and/or as warp yarn 3$a$', in particular heat-shrink warp yarn, which has at least partially retained its elastic properties even after the heat-shrink treatment has been carried out, is displaced relative to the respective adjacent yarn by 0.01 times to 2,5 times, in particular 0.05 times to 2 times, preferably 0.075 times to 1.5 times, preferably 0.1 times to 1 times, particularly preferably 0.15 times to 0.5 times, the mean yarn diameter of the heat-shrunk elastic plastic yarn, which has at least partially retained its elastic properties even after heat-shrinkage treatment, relative to the shrunken state.

According to the invention, the heat-shrunk fabric 1' may have a density of weft yarns 2', 2$a$' in the range of 7 to 200 weft yarns per cm, in particular in the range of 12 to 150 weft yarns per cm, preferably in the range of 20 to 100 weft yarns per cm. In addition, the heat-shrunk sheet 1' may have a density of warp yarns 3', 3$a$' in the range of 7 to 200 warp yarns per cm, in particular in the range of 12 to 150 warp yarns per cm, preferably in the range of 20 to 100 warp yarns per cm.

Overall, there may be a densification of the heat-shrunk sheet structure 1' due to the heat shrinkage.

According to the invention, the heat-shrunk textile sheet structure 1' can be shrunk in a range from 1% to 55%, in particular in a range from 2% to 50%, preferably in a range from 3% to 40%, preferably in a range from 4% to 30%, particularly preferably in a range from 5% to 25%, very particularly preferably in a range from 10% to 20%, relative to the respective direction of extension of the non-heat-shrunk textile sheet structure 1 and/or relative to the length and/or width of the non-heat-shrunk textile sheet structure 1.

In other words, the heat-shrunk textile sheet structure 1' may be shrunk by 1% to 55%, in particular by 2% to 50%, preferably by 3% to 40%, preferably by 4% to 30%, particularly preferably by 5% to 25%, most preferably by 10% to 20%, relative to the respective direction of extension of the non-heat-shrunk textile sheet structure 1 and/or relative to the length and/or width of the non-heat-shrunk textile sheet structure 1.

In particular, the heat-shrunk textile sheet structure 1' may have a residual heat shrinkability after heat shrinkage in a range from 1% to 50%, in particular in a range from 2% to 40%, preferably in a range from 3% to 30%, preferably in a range from 4% to 20%, particularly preferably in a range from 5% to 10%, relative to the heat shrinkability of the non-heat-shrunk textile sheet structure 1.

According to the invention, the heat-shrunk elastic plastic yarn, which has at least partially retained its elastic properties even after the heat-shrinkage treatment has been carried out, may have a diameter in the range from 0.06 mm to 3 mm, in particular in the range from 0.08 mm to 2 mm, preferably in the range from 0.12 mm to 1.75 mm, preferably in the range from 0.15 mm to 1.5 mm, particularly preferably in the range from 0.2 mm to 1 mm. In addition, the diameter and/or the titer of the heat-shrunk elastic plastic yarn, which has at least partially retained its elastic properties even after the heat-shrinkage treatment has been carried out, can be increased by a factor of 1.05 to 3, in particular by a factor of 1.1 to 2.5, preferably by a factor of 1.2 to 2, relative to the diameter of the heat-shrunk elastic plastic yarn, which at least partially retains its elastic properties even after the heat-shrinkage treatment has been carried out, in the unshrunk state.

Consequently, heat shrinkage may increase the thickness or titer of the heat-shrunk plastic yarn compared to the non-shrunk state, which may increase stability or sliding resistance.

In particular, the heat-shrunk sheet structure 1' can have a sliding resistance, in particular seam sliding resistance, in particular in each case relative to the warp direction or weft direction, of at least 45 N, in particular at least 55 N, preferably at least 70 N, preferably at least 100 N, particularly preferably at least 120 N.

Similarly, the heat-shrunk sheet structure 1' may have a tensile strength, in particular in each case relative to the warp direction or weft direction, of at least 70 N, in particular at least 90 N, preferably at least 120 N, preferably at least 140 N.

In addition, the sliding resistance, in particular seam sliding resistance, in particular in each case relative to the warp direction or weft direction, and/or the tensile strength, in particular in each case relative to the warp direction or weft direction, of the heat-shrunk sheet structure 1' may be increased by a factor of 1.05 to 2.5, in particular by a factor of 1.1 to 2, preferably by a factor of 1.15 to 1.5, relative to the non-heat-shrunk sheet structure 1.

In general, the heat-shrunk elastic plastic yarn, which has at least partially retained its elastic properties even after heat-shrinkage treatment has been carried out, can have a residual elasticity of at least 50%, in particular at least 60%, preferably at least 70%, more preferably at least 80%, particularly preferably at least 90%, very particularly preferably at least 95%, based on the elasticity of the heat-shrunk elastic plastic yarn, which has at least partially retained its elastic properties even after heat-shrinkage treatment has been carried out, in the unshrunk state.

In addition, the heat-shrunk elastic plastic yarn, which has at least partially retained its elastic properties even after heat-shrinkage treatment has been carried out, may have a residual elasticity in the range from 50% to 99%, in particular in the range from 60% to 95%, preferably in the range from 70% to 90%, based on the elasticity of the heat-shrinkable elastic plastic yarn, which at least partially retains its elastic properties even after heat-shrinkage treatment has been carried out, in the unshrunk state.

In general, therefore, in the event of incomplete heat shrinkage, a new or subsequent heat shrinkage can be performed with respect to the heat-shrunk textile sheet structure.

With regard to the determination of the properties or parameters indicated above for the heat-shrunk textile sheet structure 1', reference can be made to the corresponding explanations on the textile sheet structure 1 according to the invention with the standards or methods indicated there, which apply accordingly here to the heat-shrunk sheet structure 1' or the heat-shrunk elastic plastic yarn, which has at least partially retained its elastic properties even after heat-shrinkage treatment.

A further object of the present invention—according to a third aspect of the present invention—is further to use the textile sheet structure according to the invention, which in particular has heat shrinkage properties and elastic properties, as previously defined, for producing or manufacturing a heat-shrunk textile sheet structure, as previously defined.

For this purpose, in order to obtain the heat-shrunk textile sheet structure according to the invention, the textile sheet structure according to the invention, which preferably has heat-shrinkage properties and elastic properties, can be heat-shrunk.

A further object of the present invention—according to a fourth aspect of the present invention—is moreover the method according to the present invention for producing a heat-shrunk textile sheet structure, as defined before, wherein a textile sheet structure, in particular having heat-shrinkage properties and elastic properties, as defined before, is (heat-)shrunk by means of heat treatment.

In this context, the heat treatment may be carried out or occur at a temperature in the range of 60° C. to 140° C., in particular in the range of 80° C. to 120° C., preferably at about 100° C.

In particular, the heat treatment can be carried out for a period of time in a range from 0.5 min to 30 min, especially in a range from 1 min to 20 min, preferably in a range from 5 min to 15 min.

In particular, the heat treatment can be carried out in an air atmosphere or in air as the surrounding medium.

With regard to the shrinkage conditions in terms of temperature and duration, the underlying heat or shrinkage treatment can be designed in particular in such a way that the desired heat shrinkage of the textile sheet structure is obtained. The skilled person is able at any time to select or set the corresponding shrinkage conditions, in particular the shrinkage temperature and the shrinkage duration, depending on the desired heat shrinkage and on the material to be shrunk.

Furthermore, the present invention—according to a fifth aspect of the present invention—also relates to the use of the textile sheet structure, in particular with heat shrinkage properties and elastic properties, as previously defined, or the heat-shrunk textile sheet structure, as previously defined, in the field of the furniture industry, automotive industry or the like.

For example, the material according to the invention is suitable for the manufacture or use as a covering for support or frame structures or the like, in particular for the area of seating furniture or reclining furniture.

In this context, the present invention also relates—according to a sixh aspect of the present invention—to the use of the textile sheet structure, preferably with heat shrinkage properties and elastic properties as previously defined, for the manufacture of furniture elements, in particular seating and/or reclining furniture elements, preferably backrests, seating elements and/or reclining elements or the like, or for the manufacture of decorative elements, cavity channels, automotive accessories or the like.

In the context of the present invention, the term "seating furniture" or "reclining furniture" is to be understood broadly: Thus, these terms refer in a non-limiting manner to seating or seating elements of all kinds as well as reclining or reclining elements of all kinds, such as chairs, recliners, couches, armchairs, sofas, benches, couch sets, stools and the like. In particular, the seating or reclining furniture can be such that it has the sheet structure according to the invention, in particular with heat-shrink properties and elastic properties, or the heat-shrunk sheet structure according to the invention, in particular in the form of coverings, covers or the like.

A further object of the present invention—according to a seventh aspect of the present invention—is furthermore the method for manufacturing furniture elements, in particular seating and/or reclining furniture elements, preferably backrests, seating elements and/or reclining elements or the like, and/or for manufacturing decorative elements, cavity channels, automotive accessories or the like, wherein a textile sheet structure, in particular with heat-shrinkage properties and elastic properties, as defined above, is applied to a carrier and/or frame device or the like and/or is fastened thereto, and subsequently the textile sheet-like structure, in particular having heat-shrinkage properties and elastic properties, as defined above, is heat-shrunk at least in sections and/or regions, preferably completely and/or over the entire surface, in particular in such a way that an at least substantially wrinkle-free elastic covering of the carrier and/or frame device with the heat-shrunk textile sheet-like structure, as defined above, which is preferably under internal stress, results. In particular, this can be a matter of self-supporting or substructure-free coverings or coverings.

Finally, the present invention—according to an eighth aspect of the present invention—also relates to furniture elements, in particular seating and/or reclining furniture elements, preferably backrests and/or seating elements and/or reclining surface elements or the like, and/or decorative elements, cavity channels, automotive accessories or the like, which comprise at least one textile sheet structure, in particular having heat-shrinkage properties and elastic properties, as previously defined, or which comprise at least one heat-shrunk textile sheet material, as previously defined.

Further embodiments, variations, modifications, special features and advantages of the present invention are readily apparent and realizable to those skilled in the art upon reading the description without departing from the scope of the present invention.

LIST OF REFERENCE SIGNS

- 1 Textile sheet structure (sheet material), preferably with heat shrinkage properties
- 2 Weft yarn of the textile sheet structure (sheet material) 1
- **2*a* Weft yarn of the textile sheet structure (sheet material) 1** in the form of a heat-shrinkable elastic plastic yarn which retains its elastic properties at least in part even after heat-shrinkage treatment ("heat-shrink weft yarn")
- 3 warp yarn of the textile sheet structure (sheet material) 1
- **3*a* warp yarn of the textile sheet structure (sheet material) 1** in the form of a heat-shrinkable elastic plastic yarn which retains its elastic properties at least partially even after heat-shrinkage treatment ("heat-shrinkable warp yarn")
- 2, **2*a*, 3, 3*a* Yarn system, in particular yarn composite, of the textile sheet structure (sheet material) 1**, preferably yarn system with a plurality of weft yarns (wefts) and a plurality of warp yarns (warps)

1' heat-shrunk textile sheet (sheet material), preferably with heat shrinkage properties

2' Weft of the heat-shrunk textile sheet structure (sheet material) 1'

**2*a*' weft yarn of the heat-shrunk textile sheet structure (sheet material) 1'** in the form of a heat-shrunk elastic plastic yarn which has at least partially retained its elastic properties even after the heat-shrinkage treatment has been carried out ('heat-shrunk weft yarn')

3' Warp yarn of the heat-shrunk textile sheet structure (sheet material) 1'

**3*a*' warp yarn of the heat-shrunk textile sheet structure (sheet material) 1'** in the form of a heat-shrunk elastic plastic yarn which has at least partially retained its elastic properties even after the heat-shrinkage treatment has been carried out ("heat-shrunk warp yarn")

2', **2*a*', 3', 3*a*' Yarn system, in particular yarn composite, of the heat-shrunk textile sheet structure (sheet material) 1'**, preferably yarn system with a plurality of weft yarns (wefts) and a plurality of warp yarns (warps)

The invention claimed is:

1. A textile sheet structure in the form of a textile fabric with heat-shrinkage properties and elastic properties, wherein the textile sheet structure comprises or consists of a yarn system comprising a plurality of weft yarns and a plurality of warp yarns;

wherein the yarn system comprises or consists of at least one heat-shrinkable elastic plastic yarn which retains its elastic properties at least partially even after heat-shrinkage treatment, wherein the heat-shrinkable elastic plastic yarn after heat-shrinkage treatment has a residual elasticity in the range of from 50% to 99%, relative to the elasticity of the heat-shrinkable elastic plastic yarn in the unshrunk state, wherein the heat-shrinkable elastic plastic yarn is based on one heat-shrinkable elastomeric and thermoplastic polyester, wherein the heat-shrinkable elastic plastic yarn has a residual elongation before the heat-shrinkage treatment of less than 30%, determined according to DIN 53 835-3, and wherein the heat-shrinkable elastic plastic yarn has a residual elongation after the heat-shrink treatment of less than 35%, determined according to DIN 53 835-3, wherein the heat-shrinkable elastic plastic yarn has an elongation at break of more than 55%, determined according to DIN EN ISO 2062:2010-04;

wherein the yarn system is free from non-heat-shrinkable elastic plastic yarns and wherein the sheet structure is elastic in the weft direction and in the warp direction, wherein the elasticity of the sheet structure in the weft direction and in the warp direction, independently of one another, is in the range from 2% to 25%, determined according to DIN 53 360.

* * * * *